(12) United States Patent
Okabayashi et al.

(10) Patent No.: US 7,065,829 B2
(45) Date of Patent: Jun. 27, 2006

(54) DAMPER DEVICE

(75) Inventors: Syunsuke Okabayashi, Toyota (JP); Ken Hayashi, Aichi-ken (JP); Masaru Arakawa, Suita (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/902,565

(22) Filed: Jul. 30, 2004

(65) Prior Publication Data

US 2005/0023089 A1   Feb. 3, 2005

(30) Foreign Application Priority Data

Jul. 31, 2003  (JP) ............................. 2003-284067
Oct. 1, 2003   (JP) ............................. 2003-343092

(51) Int. Cl.
*E05F 3/04* (2006.01)

(52) U.S. Cl. .................... 16/51; 296/37.12; 16/54; 16/354

(58) Field of Classification Search ............... 16/51, 16/54, 50, 354, 337, 341; 188/300; 267/120; 49/138; 269/37.12; 74/464; 296/37.7–8
See application file for complete search history.

(56) References Cited

U.S. PATENT DOCUMENTS

| 1,165,827 | A | * | 12/1915 | Alquist | 74/440 |
|---|---|---|---|---|---|
| 1,918,879 | A | * | 7/1933 | Welton | 16/64 |
| 3,489,026 | A | * | 1/1970 | Bond | 74/425 |
| 3,672,239 | A | * | 6/1972 | Titt | 74/425 |
| 3,972,563 | A | * | 8/1976 | Gustafsson | 297/362 |
| 4,468,836 | A | * | 9/1984 | Omata | 16/82 |
| 4,773,242 | A | * | 9/1988 | Smith | 70/455 |
| 4,912,806 | A | * | 4/1990 | Orii et al. | 16/64 |
| 5,090,521 | A | | 2/1992 | Miura | |
| 5,121,521 | A | * | 6/1992 | Hagiwara et al. | 16/278 |
| 5,269,397 | A | * | 12/1993 | Kawamoto et al. | 188/290 |
| 5,277,282 | A | * | 1/1994 | Umemura | 188/290 |
| 5,839,548 | A | * | 11/1998 | Parker et al. | 188/82.1 |
| 5,862,896 | A | * | 1/1999 | Villbrandt et al. | 188/293 |
| 5,887,930 | A | * | 3/1999 | Klein | 296/37.12 |
| 6,131,242 | A | * | 10/2000 | Zipperle et al. | 16/82 |
| 6,473,936 | B1 | * | 11/2002 | Orita | 16/82 |
| 6,711,855 | B1 | * | 3/2004 | Daniels et al. | 49/342 |
| 6,779,189 | B1 | * | 8/2004 | Kim et al. | 720/601 |
| 6,789,831 | B1 | * | 9/2004 | Schmidt et al. | 296/37.13 |
| 6,793,573 | B1 | * | 9/2004 | Ueda | 454/156 |
| 6,857,675 | B1 | * | 2/2005 | Kurachi et al. | 296/37.12 |
| 2002/0170143 | A1 | * | 11/2002 | Vitry | 16/231 |
| 2004/0177559 | A1 | * | 9/2004 | Daniels et al. | 49/342 |

FOREIGN PATENT DOCUMENTS

| DE | 295 02 913.7 | | 4/1995 |
|---|---|---|---|
| GB | 2395541 A | * | 5/2004 |
| JP | 02054078 A | * | 2/1990 |
| JP | 05071263 A | * | 3/1993 |

* cited by examiner

Primary Examiner—Chuck Y. Mah
Assistant Examiner—Mark T. Vogelbacker
(74) Attorney, Agent, or Firm—Manabu Kanesaka

(57) ABSTRACT

A damper device applies damping force to a movable body assembled on a fixed body. The damper device includes a damping part, a clutch case attached to one of the fixed body and the movable body in a state having received the damping part, and a rack part moving or relatively moving accompanying movement of the movable body. The damper device effectively operate the movable body.

12 Claims, 23 Drawing Sheets

DAMPER DEVICE

BACKGROUND OF THE INVENTION AND RELATED ART STATEMENT

The present invention relates to a damper mechanism provided on an opening-and-closing member or the like, for example, a glove box of an automobile, for absorbing impact when the opening-and-closing member is opened and closed, and a damper device for damping a movement of a movable body attached to a fixed body so that the movable body is drawn out or opened up.

In a conventional damper mechanism disclosed in, for example, Japanese Patent Publication (Kokai) No. 05-76894 as shown in FIG. 24(A), a piston 104' is disposed in a cylinder 100' and slides along an inner wall surface of the cylinder 100' with an O-ring 102' in between. An annular cap 106' is provided on a front end of the cylinder 100' and a guide surface 106A' having a curved surface is formed on an inner surface side of the cap 106'. A first space part 108' is provided between the cap 106' and the piston 104', and a compression spring 110' is disposed in the first space part 108'.

Furthermore, a dividing wall 114' having an air flow-through hole 112' formed in the center thereof is formed on a back end side of the cylinder 100', and a second space part 116' is provided by means of the piston 104' and the dividing wall 114'. A third space part 118' is provided on a back end part of the cylinder 100' between the dividing wall 114'. A valve 120' is provided inside the third space part 118' for closing the flow-through hole 112'. An orifice 122' is formed at the center of the valve 120', and the second space part 116' and the third space part 118' are communicating via the flow-through hole 112' and the orifice 122'.

One end part of a cord member 124' is attached to a side of the first space part 108' of the piston 104'. As shown in FIG. 24(B), the other end part of the cord member 124' is linked to a linking member 128' of the glove box 126' through the guide surface 106A'.

With the structure described above, when a push-button type or pull-handle type lock (not shown) is released in a state that the glove box 126' is in the closed state, a rotational moment is applied to the glove box 126' in the opening direction by its own weight. The glove box 126' pulls the cord member 124' and moves the piston 104' in the opening direction (arrow direction) against a force of the compression spring 110'. Accordingly, the cord member 124' is drawn out through the guide surface 106A', and the glove box 126' begins to open.

At this time, while the glove box 126' receives damping action through fluid resistance of the orifice 122', the glove box 126' is opened in the opening direction, and the piston 104' is drawn out by the cord member 124' and moves up to the open position.

In the closing operation of the glove box 126', the piston 104' moves in a direction opposite to the opening direction by the force of the compression spring 110' and the valve 120' is opened, so that air passes through the flow-through hole 112'. Accordingly, in a state that the load on the piston 104' is reduced, the cord member 124' is pulled into the cylinder 100', and the glove box 126' is locked at the closed position of the glove box 126'.

In the conventional damper mechanism disclosed in Japanese Patent Publication (Kokai) No. 05-76894, the linking member 128' is located at the center part of the glove box 126'. Accordingly, there is a difference between a moving path of a free end of the glove box 126' and that of the linking member 128'. That is, the moving path of the linking member 128' is smaller than that of the glove box 126'. Accordingly, there is an idle distance before the damper begins to take effect, thereby making it difficult to follow a sudden movement.

Further, in a case of an air damper, a dimension of the cylinder 100' changes according to a temperature change, thereby causing a variation in the resistance or losing the damping due to leakage of air. In a case of an oil damper, a viscosity of oil increases in a low-temperature region, thereby increasing a torque and making it difficult to open the glove box 126' by its own weight.

Also, U.S. Pat. No. 5,690,194 and U.S. Pat. No. 5,839,548 have disclosed damper devices for damping only when a movable body moves in one direction. Each of the damper devices includes a rack moving together with the movable body and a pinion engaging the rack. A viscous fluid damps the pinion when the pinion rotates.

In the damper devices disclosed in U.S. Pat. No. 5,690,194 and U.S. Pat. No. 5,839,548, when the movable body moves in the opposite direction, the engagement between the rack and the pinion is released. Accordingly, it is difficult to securely engage the pinion with the rack again when the movable body moves again in the one direction, thereby requiring a special mechanism in order to assure stable operation.

In view of the problems described above, an object of the present invention is to provide a one-way type damper mechanism in which an idle time before the damper takes effect is short, and the damper effect is obtained regardless of a temperature.

Another object of the present invention is to provide a damper mechanism that applies the damping only when a movable body moves in one direction. In the damper mechanism, a rack portion of a rack part moves with a movable body, and always engages a pinion portion of a damping part during the movement of the movable body, so that the damping is securely applied only when the movable body moves in the one direction.

Further objects and advantages of the invention will be apparent from the following description of the invention.

SUMMARY OF THE INVENTION

In order to attain the objects described above, according to the present invention, a damper device for applying damping to movement of a movable body assembled on a fixed body so as to be capable of drawing-out movement and opening-up movement, and the like, comprises: a damping part; a clutch case attached to one of the fixed body and the movable body in a state having received the damping part; and a rack part moving or relatively moving accompanying movement of the movable body.

The damping part comprises a first part and a second part, which are assembled so as to be capable of rotation in a manner such that each uses the other as a shaft bearing centered on the same axis of rotation, and has a sealed-in space of viscous fluid between one and the other when assembled, such that damping is applied to the rotation by the viscous fluid sealed in the sealed-in space. The first part has a pinion part for engaging with a rack part of the rack part, and an outer perimeter part of the second part is formed as a gear. The clutch case has a receiving space for receiving the damping part so as to be capable of rotation as a whole. The receiving space is made such that the inner diameter in the direction following the direction of movement of the rack part is made somewhat larger than the outer diameter of the second part of the damping part, and the inner diameter in the direction intersecting this direction of movement is made roughly equal to the outer diameter of the second part of the damping part.

A coupling projection is formed on a part of an inner wall part forming the receiving space for engaging the outer perimeter part of the second part of the damping part by movement of the damping part within the receiving space accompanying forward movement of the rack part and obstructs rotation of the damping part as a whole within the receiving space. The rack part is positioned in a manner such that the rack part thereof always engages the pinion part of the first part of the damping part received inside the clutch case throughout the movement thereof.

In the receiving space of the clutch case, because the inner diameter in the direction following the direction of movement of the rack part is made somewhat larger than the outer diameter of the second part of the damping part, when the rack part moves by the movement of the movable body, the damping part also moves inside the clutch case accompanying this. That is, when the rack part moves forward, the damping part also moves toward the forward direction inside the receiving space of the clutch case. Conversely with this, when the rack part moves backward, the damping part also moves toward the backward direction in the receiving space of the clutch case.

Because the coupling projection is formed on a part of the inner wall part forming the receiving space of the clutch case for engaging the outer perimeter part of the second part of the damping part moving accompanying such movement when the rack part moves forward in this manner, in the case when the movable body moves so as to move the rack part forward, the rotation of the damping part as a whole inside the clutch case is obstructed, and only the first part applied with damping to the rotation by the viscous fluid rotates with the second part as a shaft bearing in a state that the pinion part engages the rack part of the rack part. By this, it is possible to apply damping by means of the rack part to the movement of the movable body in the direction of moving the rack part forward.

Conversely, in the case when the movable body moves so as to move the rack part backward, because the damping part moves in the direction of backward movement of the rack part inside the receiving space of the clutch case, whereby the engagement between the coupling projection formed on a part of the inner wall part forming the receiving space of the clutch case and the outer perimeter part of the second part of the damping part is released, the damping part rotates as a whole inside the receiving space inside the clutch case by the movement of the rack part in a state that the pinion part of the first part engages the rack part of the rack part. By this, it is possible that damping is not applied to the movement of the movable body in the direction of moving the rack part backward.

The clutch case has a fixing shaft to be inserted into a clutch case fixing hole formed in the movable body or the fixed body, or a fixing hole into which a clutch case fixing shaft formed on the movable body or the fixed body is inserted. Accordingly, it is possible to fix the clutch case easily and properly to the movable body or the fixed body.

The rack part is formed on one side part following the longitudinal direction of a band-shaped body; and a holding piece for holding the band-shaped body is formed on the clutch case in a position on one side of the band-shaped body. Accordingly, it is possible that the rack part always properly engages the pinion part of the first part of the damping part.

The clutch case has a bottom part adjacent to the receiving space, and an open part freeing the receiving space on the side opposite the bottom part. A coupling part coupled with an edge part of the second part of the damping part by once being elastically deformed accompanying insertion of the damping part into the receiving space through the open part and then springing back in a position having completely received the damping part is formed on the edge of this open part. Accordingly, it is possible to incorporate the damping part into the clutch case with one touch operation.

The clutch case is installed on the fixed body having the movable body so as to be capable of rotation centered on a rotating shaft. The rack part is assembled onto the fixed body so as to be capable of rotation by a rotating shaft provided at a position different from the rotating shaft of the movable body. The rack part is disposed following an arc of a virtual circle centered on the rotating shaft of the rack part. A groove part for receiving a linking projection provided on the movable body is provided so as to extend for a distance from the side of the rotating shaft of the rack part toward the side of the rack part. A part of the groove part is always positioned on the track of movement of the linking projection rotating accompanying rotation of the movable body.

Accordingly, when the movable body moves forward, the linking projection moves in the forward direction, and the rack part having received the linking projection in the groove part moves forward centered on the rotating shaft by the linking projection pushed against the groove wall of the groove part. The pinion part of the first part of the damping part engages the rack part moving forward in this manner, and during this forward movement, the outer perimeter part of the second part of the damping part and the coupling projection of the clutch case are engaged, and the rotation of the damping part as a whole inside the clutch case is obstructed. Therefore, only the first part rotates while receiving damping by the viscous fluid, whereby damping is applied to the forward movement of the rack part, i.e. the forward movement of the movable body.

As the movable body moves forward, the linking projection approaches the rotating shaft of the rack part inside the groove part of the rack part while causing the rack part to move forward. Because the distance between the rotating shaft of the rack part (fulcrum) and the engagement position of the pinion part of the first part with the rack part of the rack part (force point) is always constant, as the linking projection approaches the rotating shaft of the rack part (that is, as the distance between the force point and the action point becomes closer), the damping force of the damping part on the linking projection becomes greater. By this, it is possible to make the damping force on the movable body greater as the movable body moves in the forward direction, and the movement is controlled such that the movable body moves comparatively rapidly at the start of forward movement and that movement is gradually slowed as it approaches the end of forward movement.

In the damper device according to the invention, it is possible that damping is applied surely only in movement toward one direction of the movable body, while the rack part moving or relatively moving accompanying movement of the movable body and the pinion part of the damping part are always engaged throughout the movement of the rack part.

According to the invention, a damping mechanism comprises: a rack installed on an opening-and-closing member supported by an installation receiving member and rotating between an open position and a closed position; a first gear capable of engaging the rack; a second gear capable of engaging the first gear and being controlled by a damper; and a base member installed on the installation receiving member and having the second gear disposed thereon, causing the first gear to slide toward the direction of engaging the second gear when the opening-and-closing member is opened toward the open position, and holding the first gear so as to be capable of sliding toward the direction of disengagement from the second gear when the opening-and-closing member is closed toward the closed position.

In the invention, the rack is installed on the opening-and-closing member supported by the installation receiving member and rotating between the open position and the closed position, and the first gear engages the rack. The second gear controlled by the damper is capable of engaging the first gear, and a damper effect is obtained on the opening-and-closing member by means of the second gear, the first gear, and the rack in a state of engaging the second gear.

The base member is installed on the installation receiving member, and the second gear is disposed on the base member. When the opening-and-closing member is opened toward the open position, the first gear is pressed by the rack moving together with the opening-and-closing member, and the first gear and the second gear are engaged. By this, a damper effect is applied to the opening-and-closing member, and the opening-and-closing member opens slowly.

On the other hand, when the opening-and-closing member is closed toward the closed position, the first gear slides toward the direction of disengagement from the second gear such that the damper effect is not transmitted to the first gear. By this, when the opening-and-closing member is closed, the load of the damper is not applied to the opening-and-closing member.

As described above, in the damper mechanism, an effect as a one-way damper can be obtained assuredly. Also, because the first gear is pressed by the rack moving together with the opening-and-closing member, and the first gear and the second gear are engaged such that a damper effect is obtained, the idle time until the damper begins to take effect can be made shorter by making the distance between the first gear and the second gear shorter. By this, when closing the opening-and-closing member, even if the operation of opening the opening-and-closing member is just attempted, the first gear and the second gear can be engaged immediately, and the damper effect can be obtained.

According to the invention, the shaft part of the first gear slides following a long hole formed in the base member. The shaft part of the first gear slides following the long hole formed in the base member. Thus, by providing the long hole in the base member and causing the first gear which transmits the damper effect to the opening-and-closing member to slide, it is engaged with or disengaged from the second gear. By this, the torque transmission from damper member which controls the damper is turned on/off, and the damper mechanism is made one way.

According to the invention, forcing means for forcing the first gear toward the direction of disengaging from the second gear is provided on the base member. The forcing means which forces the first gear toward the direction of disengaging from the second gear is provided on the base member. That is, when opening the opening-and-closing member, the first gear is pressed by the rack in opposition to the force of the forcing means, and it is engaged with the second gear.

According to the invention, the distance between the engaged position of the first gear with the rack and the rotation central position of the opening-and-closing member is made variable. By making the distance between the engaged position of the first gear with the rack and the rotation central position of the opening-and-closing member variable, the magnitude of the force necessary for opening the opening-and-closing member can be changed in the engaged position of the first gear with the rack.

That is, in the case when the damper force (damping force by the damper member) is constant, if the magnitude of the force necessary for opening the opening-and-closing member is large, the damper effect is reduced as compared with the case when the magnitude of that force is small.

Therefore, the distance between the engaged position of the first gear with the rack and the rotation central position of the opening-and-closing member is changed. On the side of the start of opening (closed position) of the opening-and-closing member, the distance between the engaged position of the rack with the first gear and the rotation central position of the opening-and-closing member is made shorter, and the magnitude of the force necessary for opening the opening-and-closing member is made greater in the engaged position of the first gear with the rack. On the side of the end of opening (open position) of the opening-and-closing member, the distance between the engaged position of the rack with the first gear and the rotation central position of the opening-and-closing member is made longer, and the magnitude of the force is made smaller.

By this, on the side of the closed position of the opening-and-closing member, the damper force becomes smaller than on the side of the open position. Therefore, it becomes possible to open the opening-and-closing member assuredly even in low-temperature regions.

According to the invention, the rack is linear, and the base member is installed so as to be capable of rocking on the side wall. By making the rack which moves together with the opening-and-closing member linear and installing the base member, to which is attached the first gear which engages with the rack, to be capable of rocking on the attachment receiving member, the distance between the engaged position of the rack with the first gear and the rotation central position of the opening-and-closing member is changed.

Concretely, on the side of the closed position of the opening-and-closing member, the distance between the engaged position of the first gear with the rack and the rotation central position of the opening-and-closing member is made shorter. On the side of the open position of the opening-and-closing member, the distance between the engaged position of the first gear with the rack and the rotation central position of the opening-and-closing member is made longer.

Because the present invention is constituted as mentioned above, the effect as a one-way damper can be obtained assuredly. Also, because the first gear is pressed by the rack which moves together with the opening-and-closing member and the first gear and the second gear are engaged such that the damper effect is obtained, the idle time until the damper begins to take effect can be made shorter by making the distance between the first gear and the second gear shorter. By this, when closing the opening-and-closing member, even if the operation of opening the opening-and-closing member is just attempted, the first gear and the second gear can be engaged immediately such that the damper effect is obtained.

The torque transmission due to the damper mechanism which controls the damper is turned on/off, and the damper mechanism is made one way. When opening the opening-and-closing member, the first gear is pressed by the rack in opposition to the force of the forcing means, and it is engaged with the second gear.

The distance between the engaged position of the first gear with the rack and the rotation central position of the opening-and-closing member is changed. On the side of the closed position of the opening-and-closing member, the distance between the engaged position of the rack with the first gear and the rotation central position of the opening-and-closing member is made shorter, and the magnitude of the force necessary for opening the opening-and-closing member is made greater in the engaged position of the first gear with the rack. On the side of the open position of the opening-and-closing member, the distance between the engaged position of the rack with the first gear and the rotation central position of the opening-and-closing member is made longer, and the magnitude of the force is made smaller. By this, on the side of the closed position of the opening-and-closing member, the damper effect can be made smaller than on the side of the open position. Therefore, it becomes possible to open the opening-and-closing member assuredly even in low-temperature regions.

BRIEF DESCRIPTION OF THE DRAWINGS

FIGS. 23(A) and 23(B) are enlarged views of FIGS. 21(A) and 21(B), wherein FIG. 23(A) shows a state that gears constituting the damper mechanism are disengaged, and FIG. 23(B) shows a state that the gears are engaged; and FIGS. 24(A) and 24(B) are views showing a conventional damper mechanism, wherein FIG. 24(A) is a sectional view thereof, and FIG. 24(B) is a side view of an opening-and-closing member of a glove box using the damper mechanism.

DETAILED DESCRIPTION OF PREFERRED EMBODIMENTS

Hereunder, embodiments of the present invention will be explained with reference to the accompanying drawings.

Figure 1:
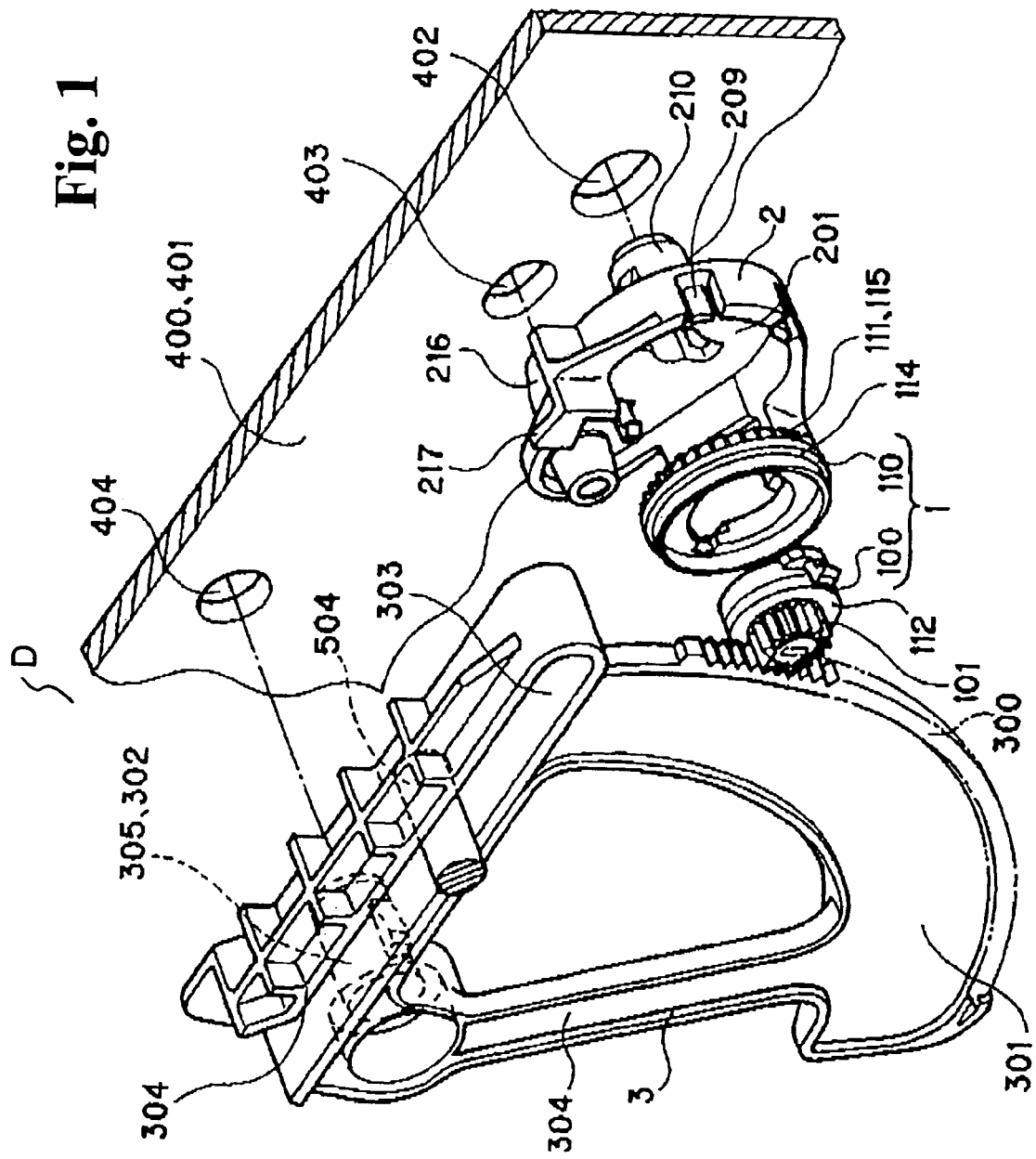
FIG. 1 is an exploded perspective view of a damper device D of the invention.
Figure 2:
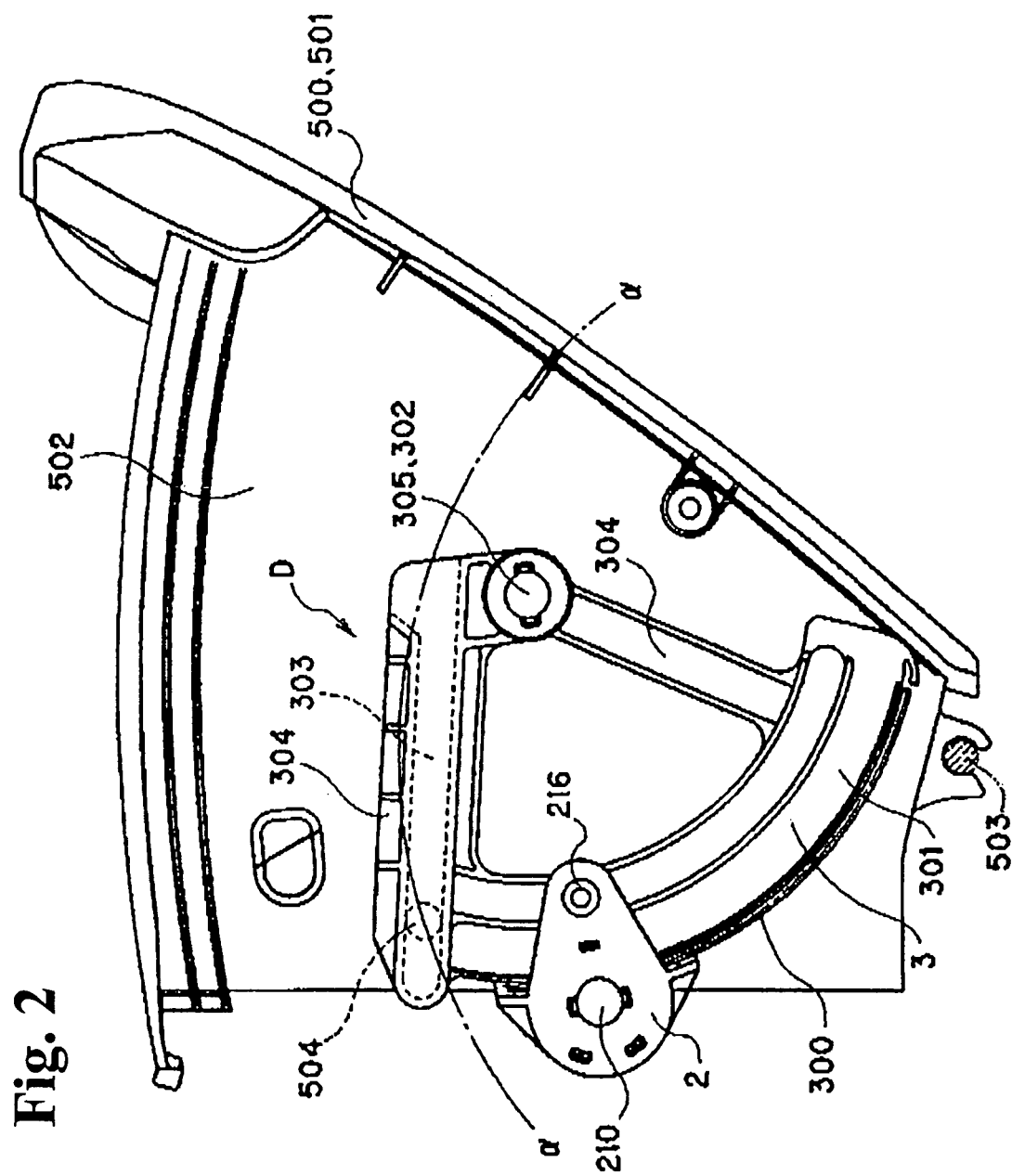
FIG. 2 is a side view of the damper device in a use state.
Figure 3:
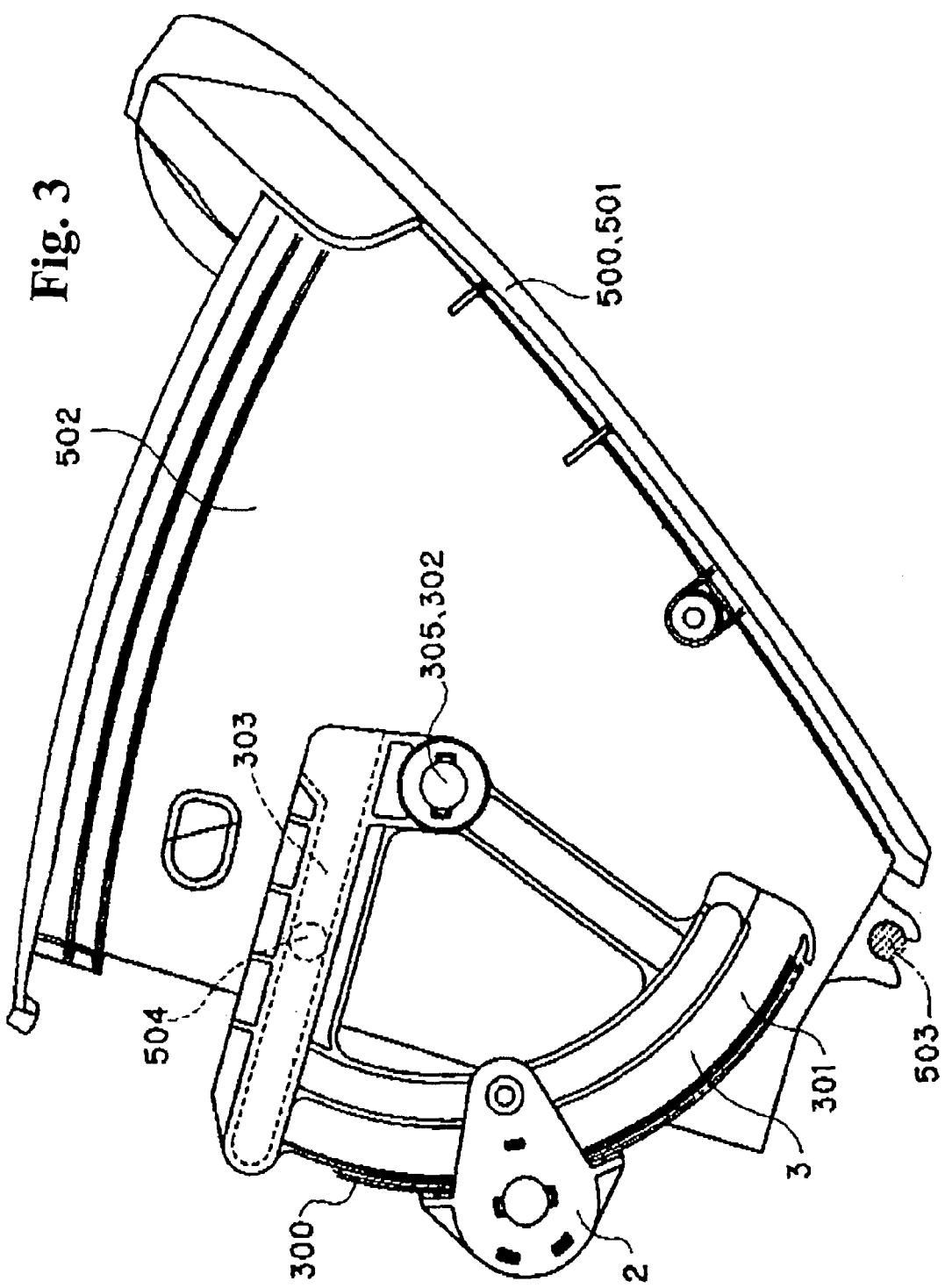
FIG. 3 is a side view of the damper device in a use state.
Figure 4:
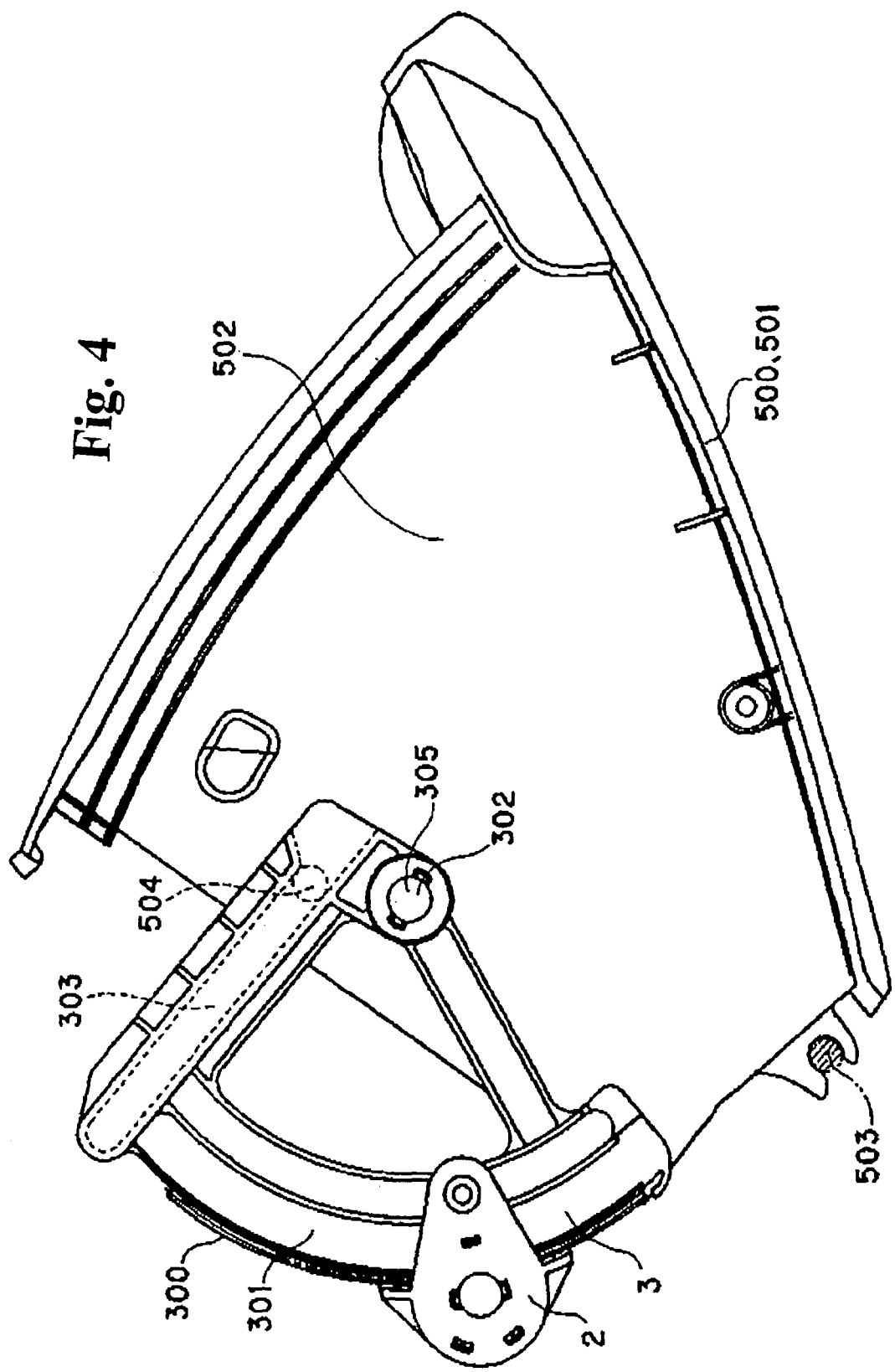
FIG. 4 is a side view of the damper device in a use state.
Figure 5:
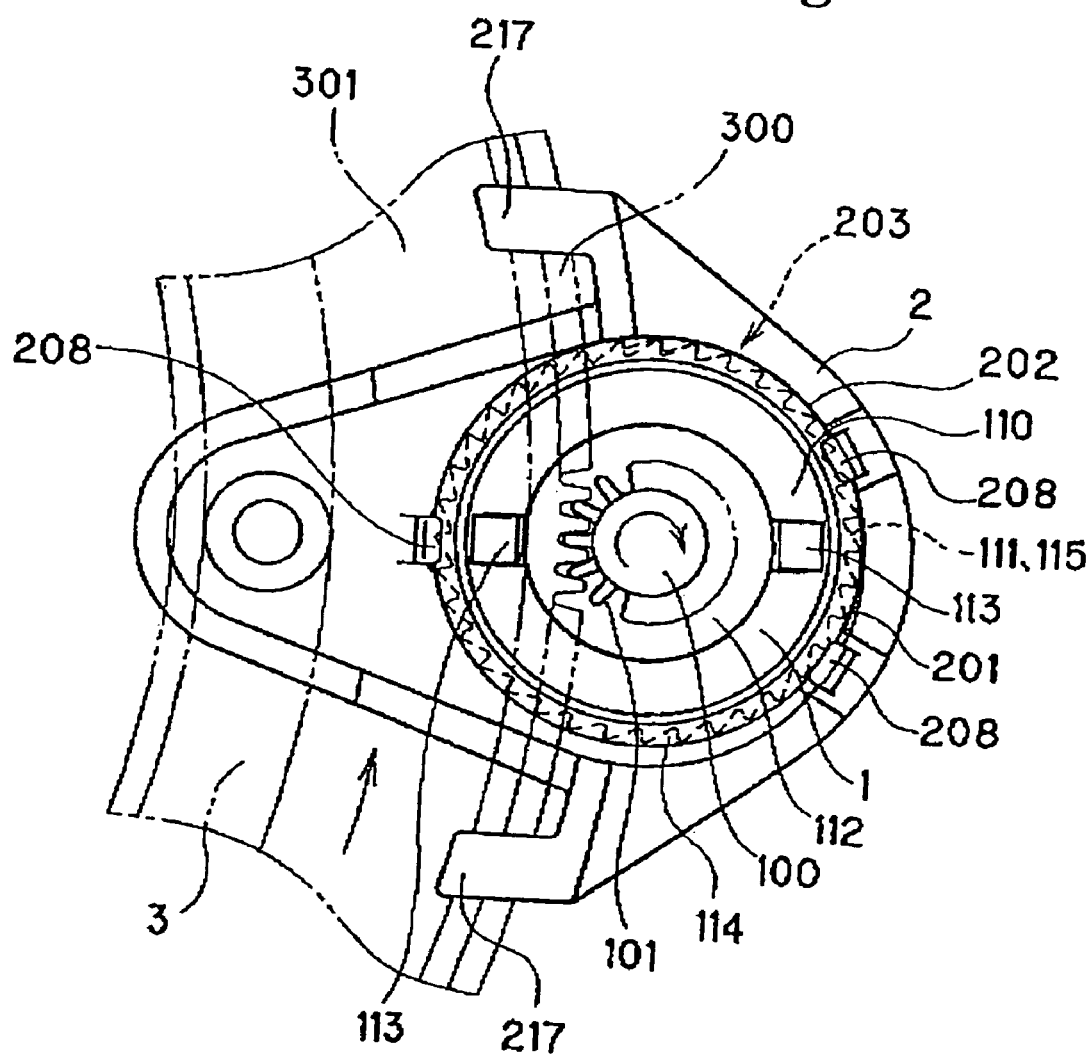
FIG. 5 is a view showing an essential part of the damper device D.
Figure 6:
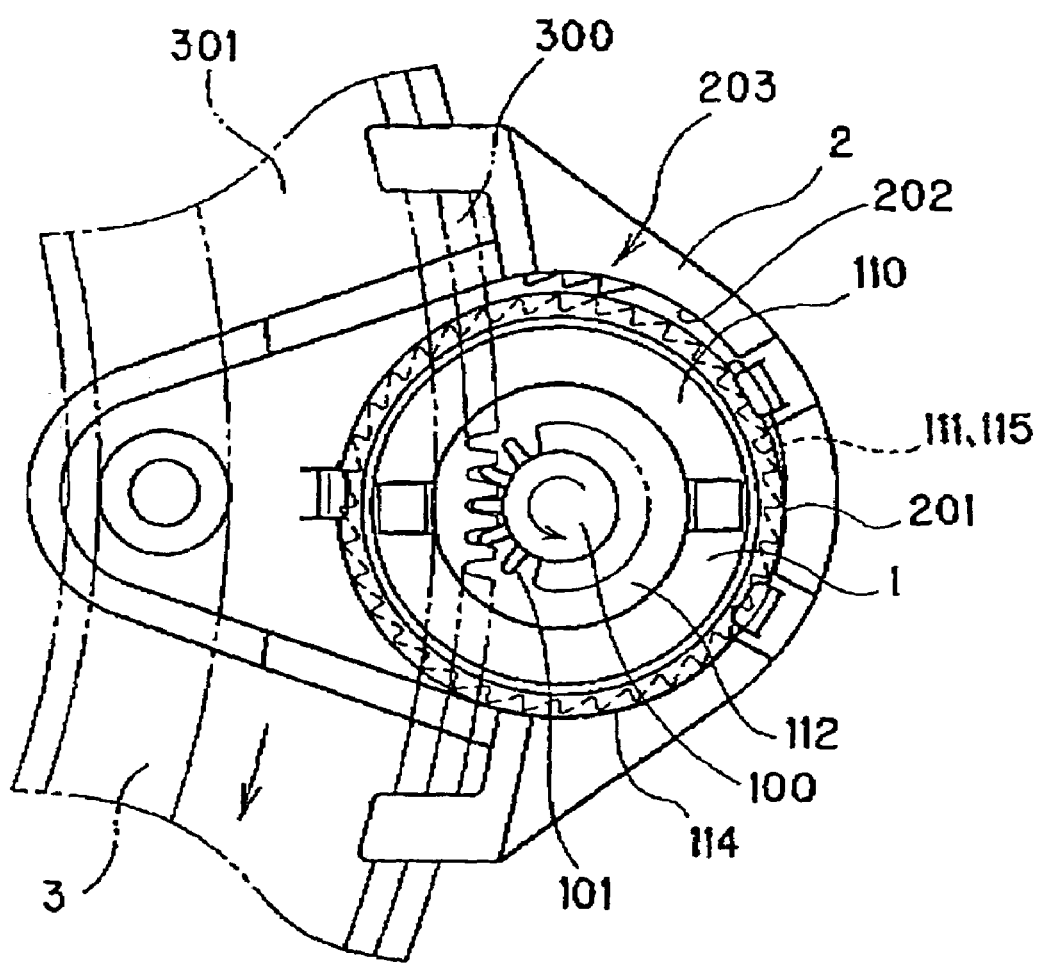
FIG. 6 is a view showing an essential part of the damper device D.

FIG. 1 is an exploded view of various components constituting a damper device D according to an embodiment. FIG. 2 through FIG. 4 show examples in which the damper device D damps a movement of a glove box 501 viewed from a side of the glove box 501 in a state that a panel 401 disposed inside an instrument panel with the damper device D is omitted. FIG. 5 shows a state that damping force is generated when only a first part 100 of a damping part 1 constituting the damper device D is rotated. FIG. 6 shows a state that the damping force is not generated when the damping part 1 constituting the damper device D is rotated as a whole inside a clutch case 2. That is, FIG. 6 shows the clutch case 2 and the damping part 1 viewed from a side opposite to that in FIG. 2, i.e. from a side facing a side plate 502 of the glove box 501.

Figure 7:
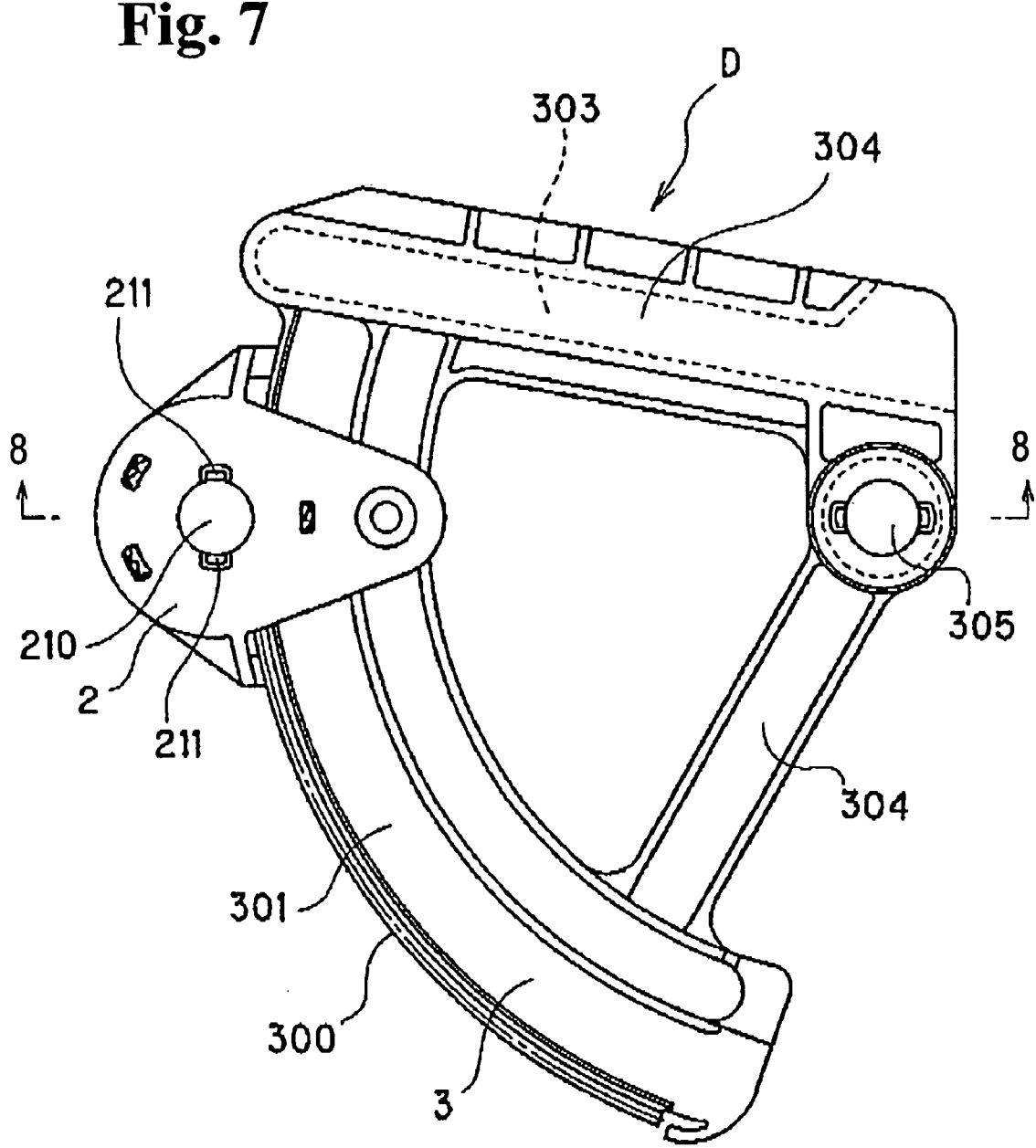
FIG. 7 is a side view of the damper device.
Figure 8:
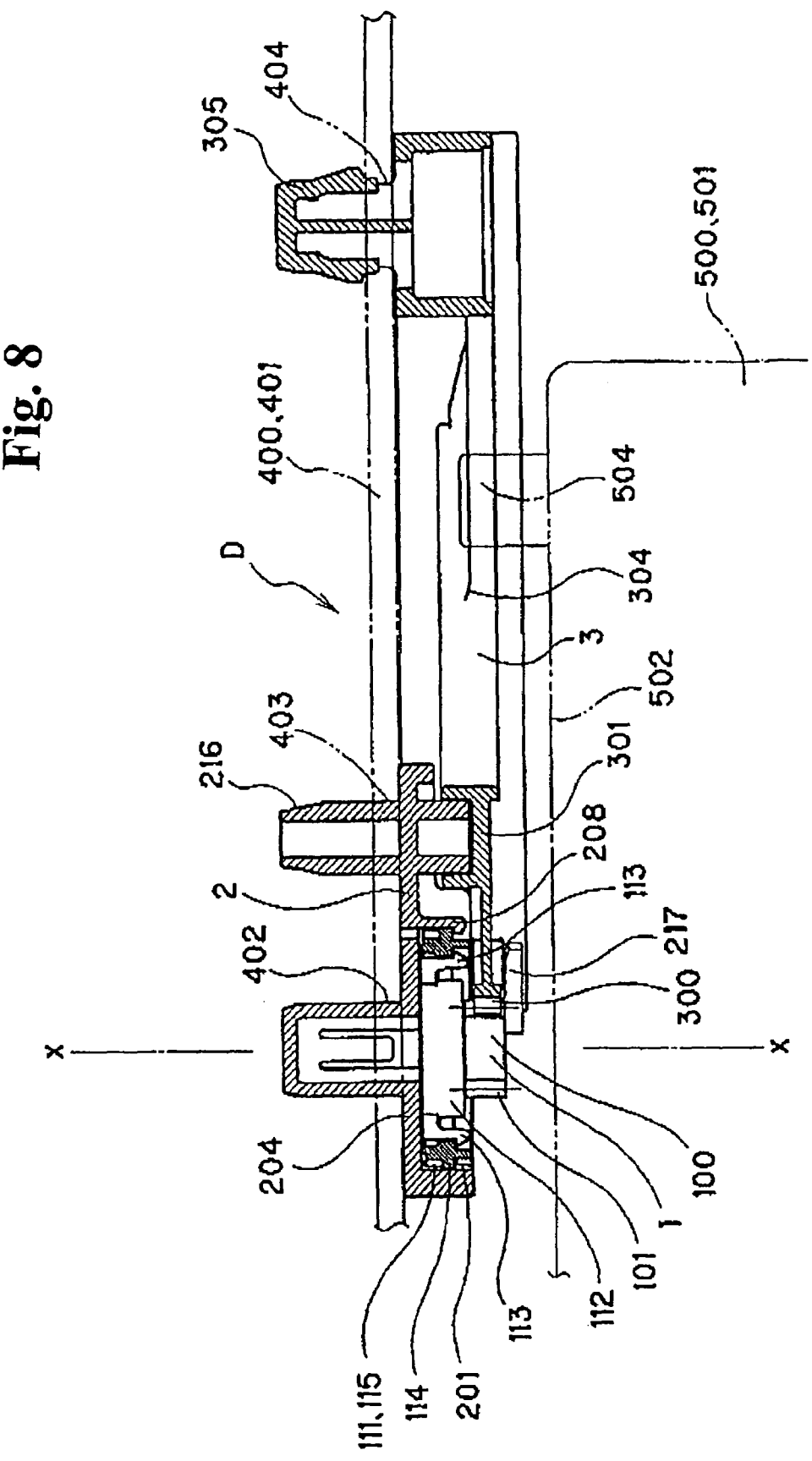
FIG. 8 is a sectional view take along line 8—8 in FIG. 7.
Figure 9:
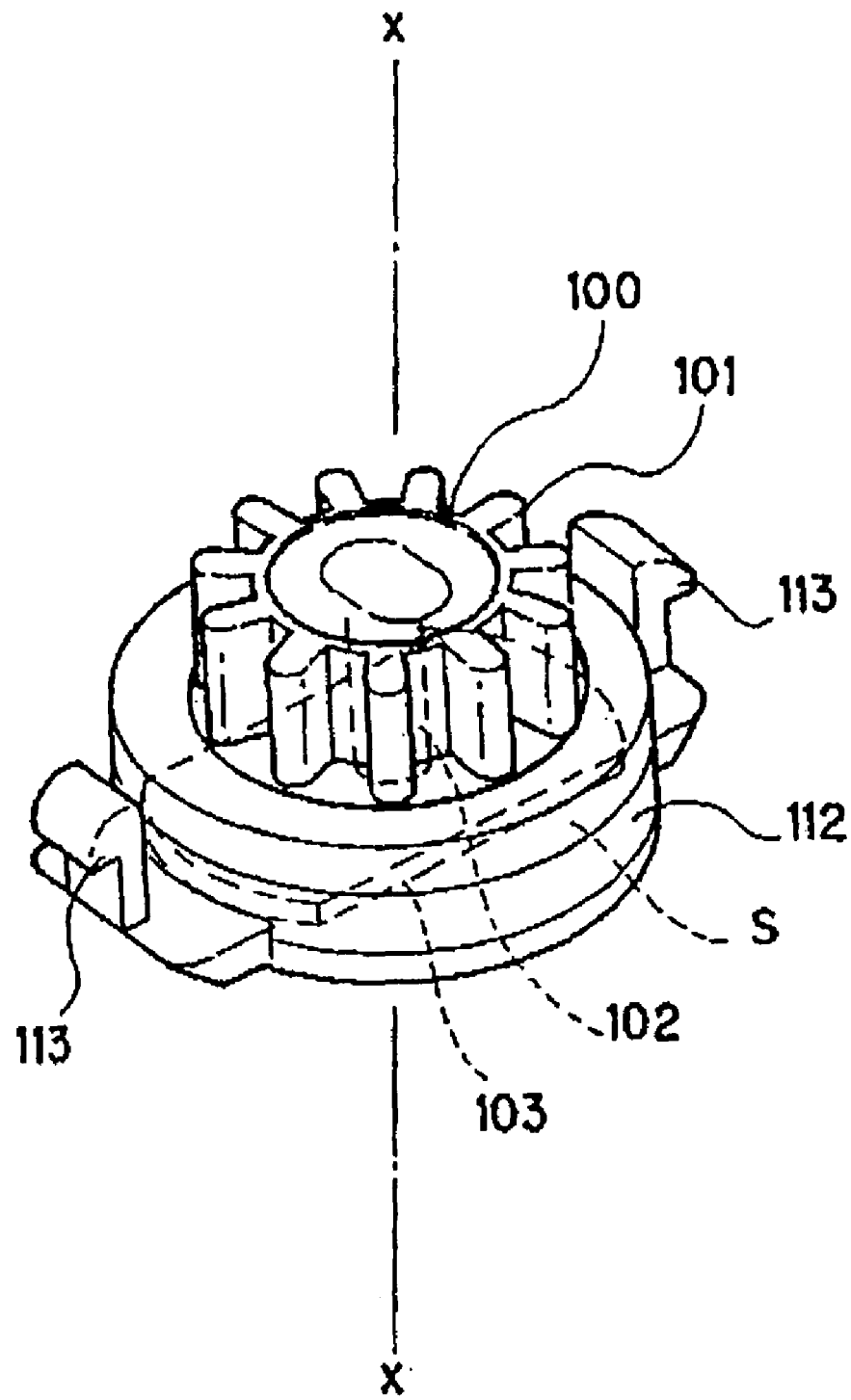
FIG. 9 is a perspective view of oil damper components constituting a damping part 1.
Figure 10:
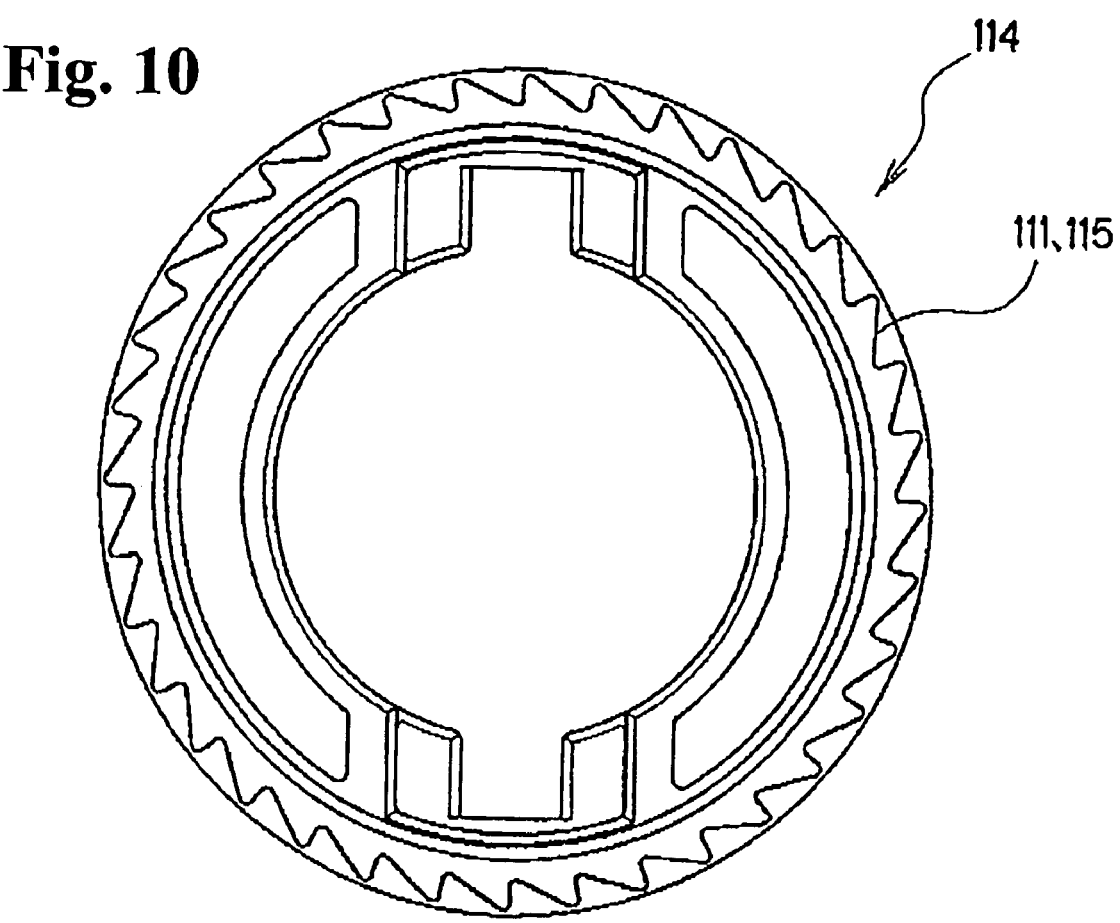
FIG. 10 is a backside view of a ring body 114 constituting the damping part 1.
Figure 11:
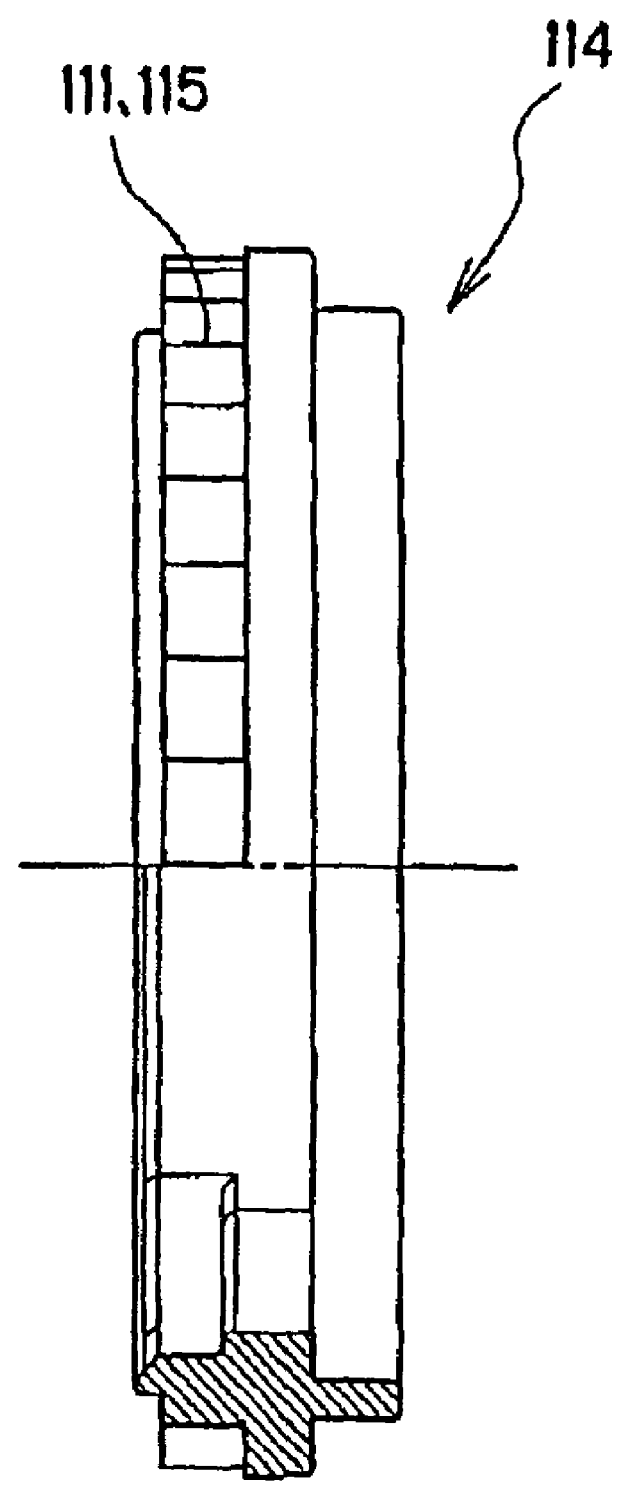
FIG. 11 is a partial sectional right side view of the ring body.
Figure 12:
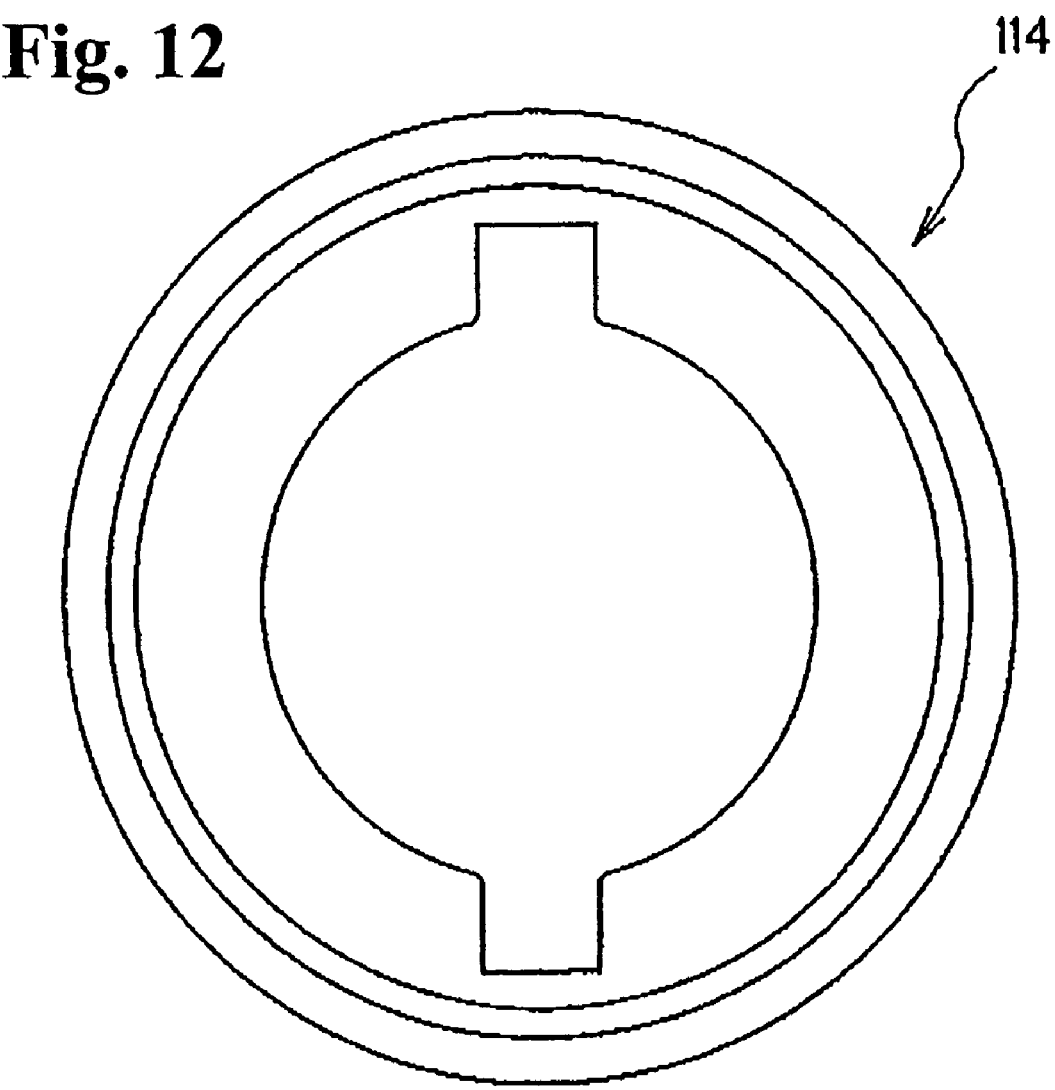
FIG. 12 is a front view of the ring body.
Figure 13:
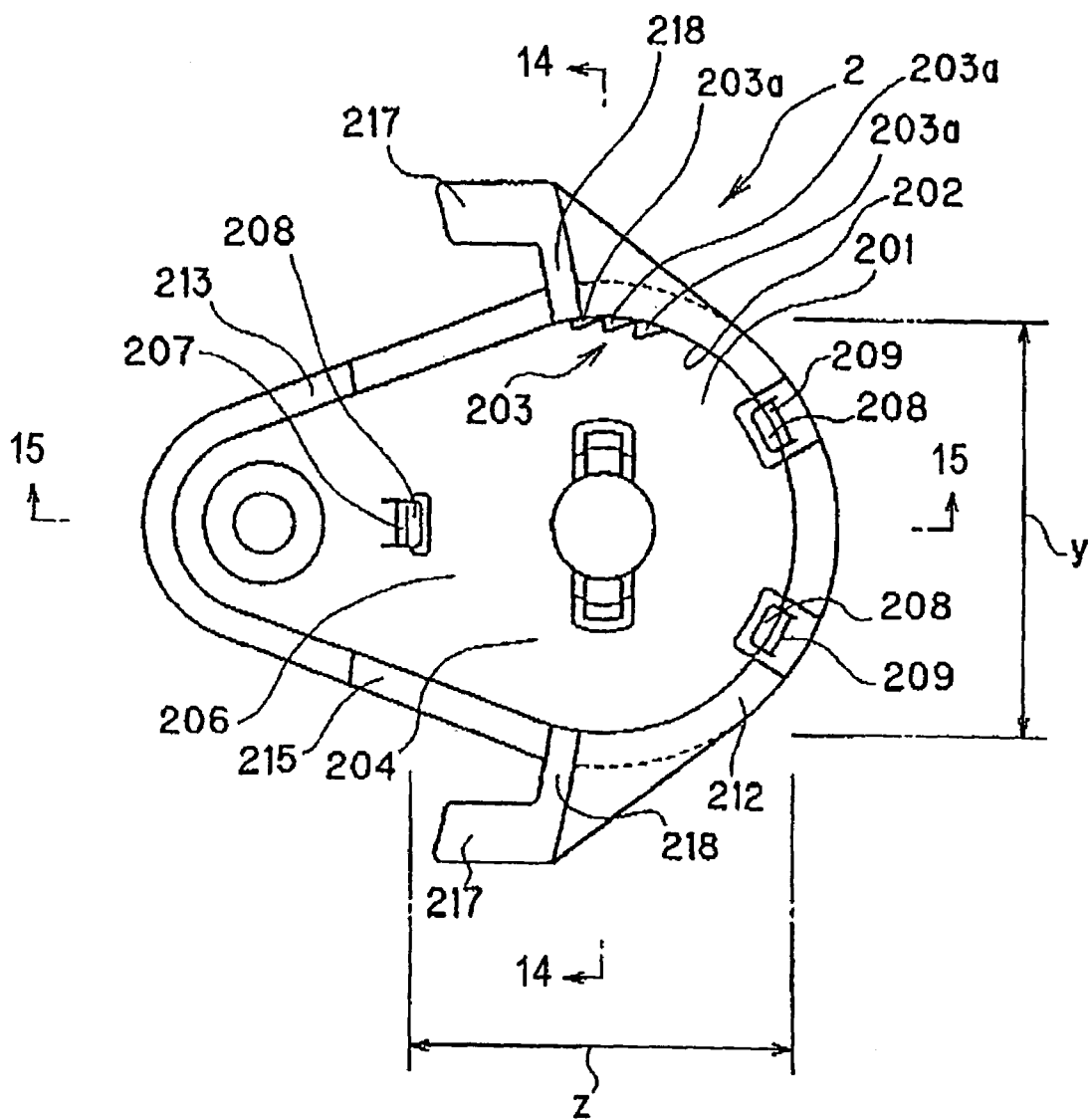
FIG. 13 is a front view of a clutch case 2.
Figure 14:
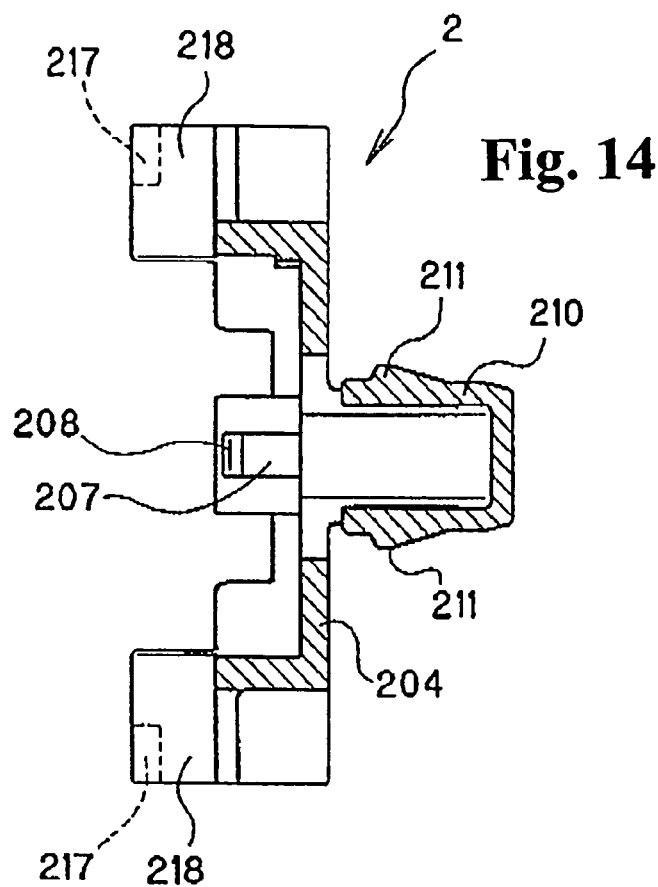
FIG. 14 is a sectional view taken along line 14—14 in FIG. 13.
Figure 15:
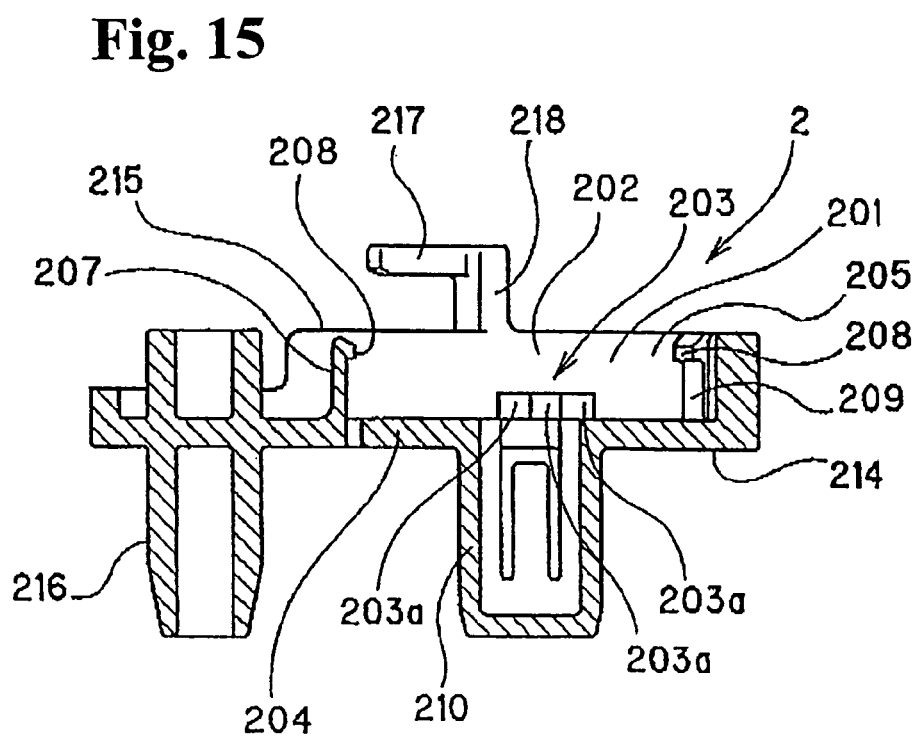
FIG. 15 is a sectional view taken along line 15—15 in FIG. 13.
Figure 16:
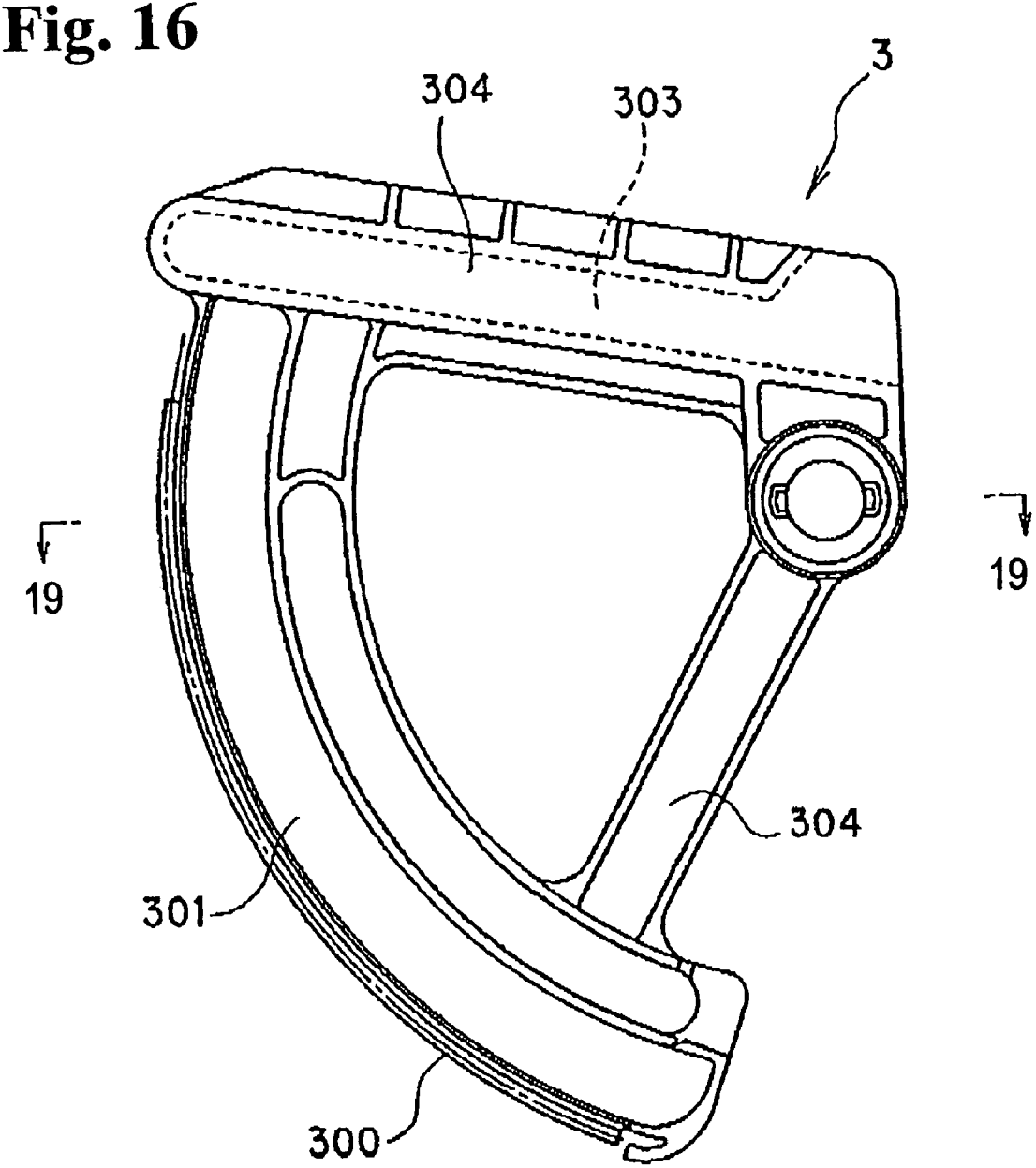
FIG. 16 is a backside view of a rack part 3.
Figure 17:
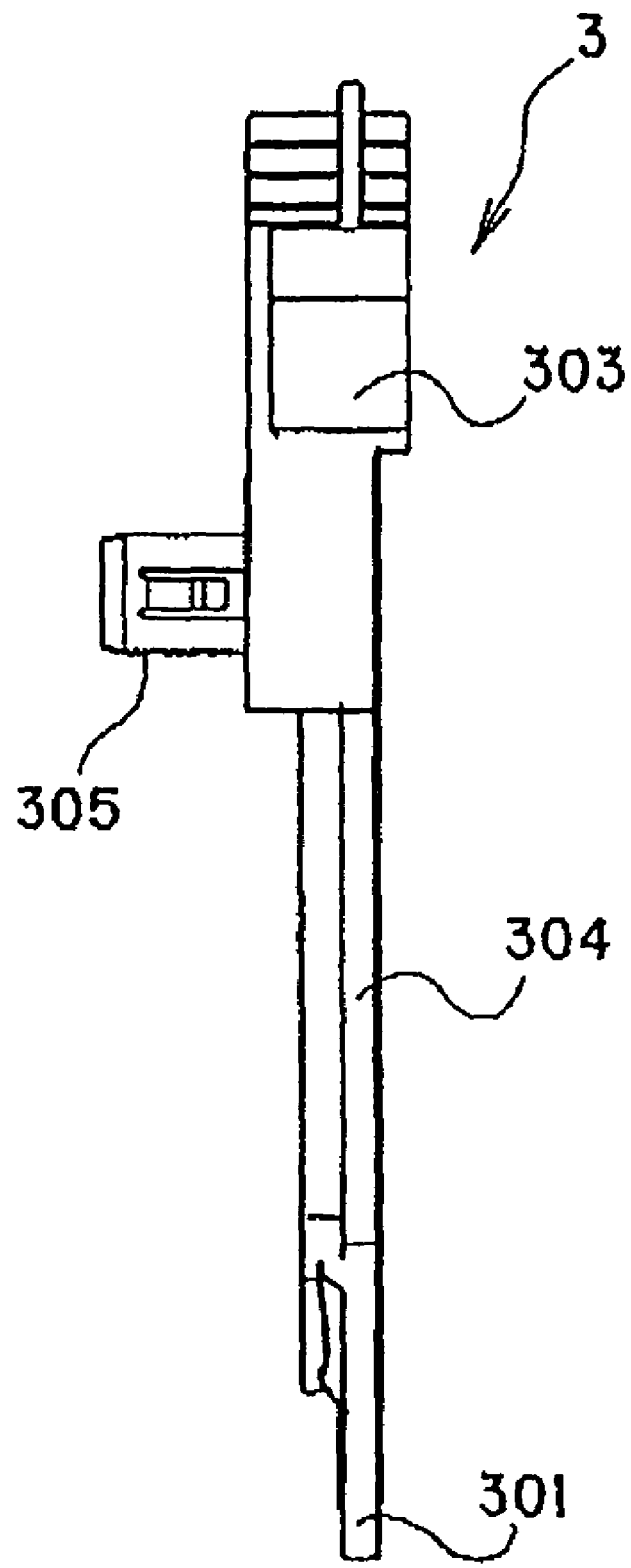
FIG. 17 is a side view of the rack part 3.
Figure 18:
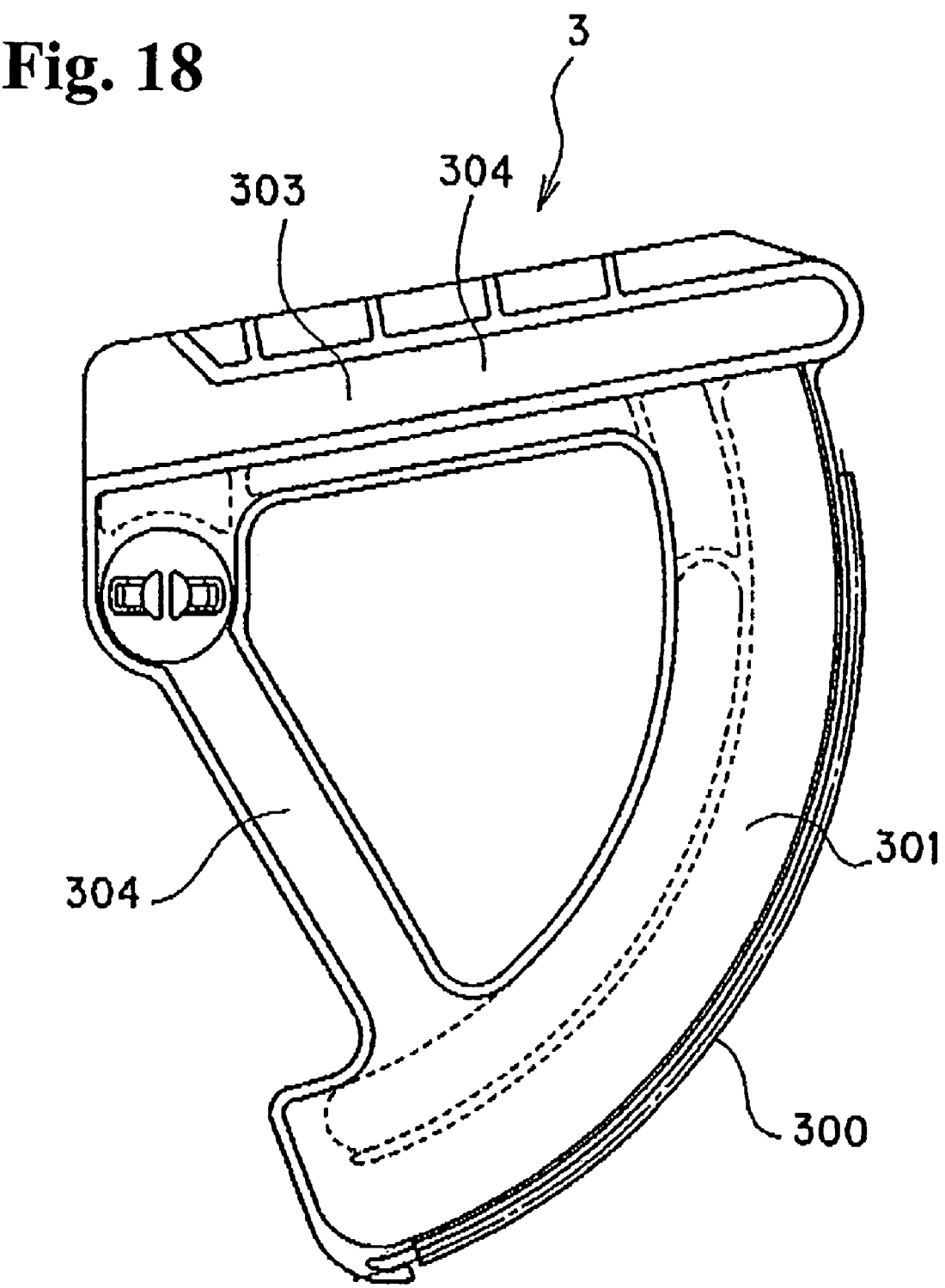
FIG. 18 is a front view of the rack part 3.
Figure 19:
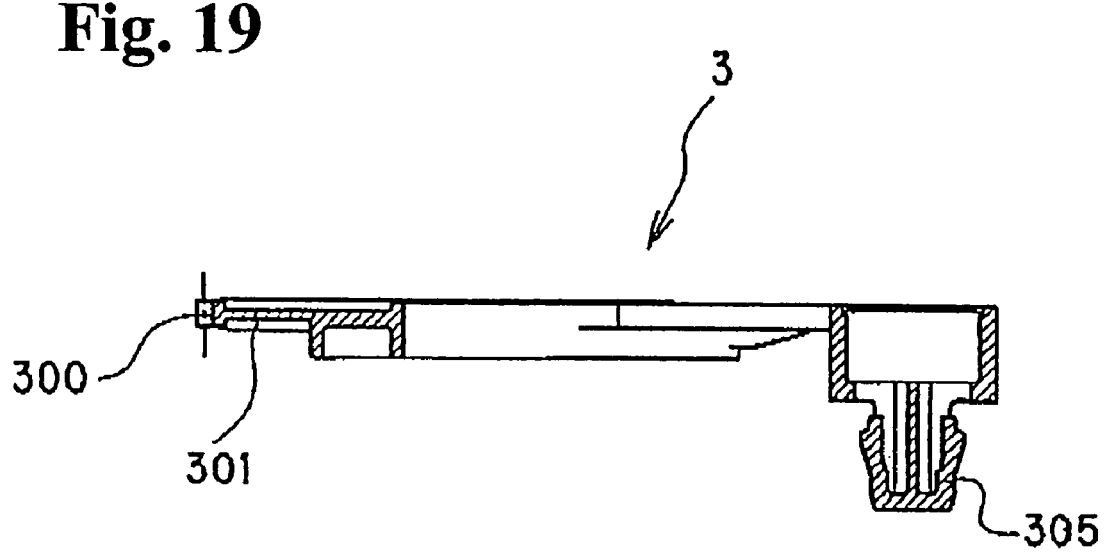
FIG. 19 is a sectional view taken along line 19—19 in FIG. 16.

FIG. 7 shows the damper device D viewed from a side, and FIG. 8 is a sectional view of the damper device D in an assembled state. FIG. 9 is a perspective view of only the first part 100 constituting the damping part 1 and an oil damper comprising a cylindrical body 112 constituting a second part 110. FIGS. 10 to 12 show a ring body 114 constituting the damping part 1, FIGS. 13 to 15 show the clutch case 2, and FIGS. 16 to 19 show a rack part 3.

According to the embodiment, the damper device D applies damping to the movement of a movable body 500 attached to a fixed body 400 so that the movable body 500 is drawn out and opened. The movable body 500 includes a drawing out member such as, for example, a drawer, ash tray, and cup holder, and an opening member such as a door and a cover. In the embodiment, the damper device D applies damping to an opening movement of a glove box 501 provided inside an automobile compartment. That is, the glove box 501 serves as the movable body 500, and the instrument panel provided with the glove box 501 capable of opening serves as the fixed body 400.

The damper device includes the damping part 1; the clutch case 2 attached to one of the fixed body 400 and the movable body 500 for retaining the damping part 1; and the rack part 3 moving together with the movable body 500. In the embodiment, the clutch case 2 is attached to the panel 401 facing an outer surface of a side plate 502 of the glove box 501 disposed in the instrument panel, and the rack part 3 is moved accompanying the opening movement of the glove box 501.

The damping part 1 comprises the first part 100 and the second part 110. The first part 100 and the second part 110 are assembled such that one rotates with the other as a pivot around a common axis x. The first part 100 and the second part 110 have a sealed-in space S for filling viscous fluid between one and the other. The viscous fluid sealed in the sealed-in space S applies damping to the rotation of the first part 100 and the rotation of the second part 110 around the axis x.

The first part 100 has a pinion part 101 for engaging the rack part 300 of the rack part 3. An outer perimeter part 111 of the second part 110 is formed in a gear. In the embodiment, the first part 100 is constituted by attaching the pinion part 101 to one end of a shaft body 102 with an axis thereof situated on the axis x while the rotational center of the pinion part 101 is aligned on the axis x, and by providing a plate-shaped wing body 103 protruding two sides in the diametric direction of the shaft body 102 on the other end of the shaft body 102.

The second part 110 includes a cylindrical body 112 and a ring body 114 for receiving the cylindrical body 112. The cylindrical body has both ends closed fluid tightly such that only the pinion part 101 of the first part 100 protrudes and the remaining portion of the first part 100 is housed therein so that the first part 100 rotates. An axis of the cylindrical body 112 is aligned to the axis x. In the embodiment, the inside of the cylindrical body 112 serves as the sealed-in space S of viscous fluid. The viscous fluid housed inside the sealed-in space S generates viscosity resistance on the wing body 103 rotating inside the cylindrical body 112 when the first part 100 rotates, so that the damping is applied to the rotation of the first part 100 and the rotation of the second part 110 around the axis x. The viscous fluid typically includes silicon oil or grease oil.

In the embodiment, the cylindrical body 112 has coupling hooks 113 capable of elastic deformation on both sides in the diametric direction thereof. When the cylindrical body 112 is inserted into the ring body 114, the coupling hooks 113 are elastically deformed inwardly once. Then, the coupling hooks 113 engage one side of the ring body 114 by spring-back of the coupling hooks 113 at a position where the cylindrical body 112 is completely inserted into the ring body 114, thereby integrally attaching the cylindrical body 112 to the ring body 114.

A circular gear part 115 is formed on an outer perimeter part 111 of the ring body 114. When the cylindrical body 112 is attached to the ring body 114, the outer perimeter part 111 of the second part 110 forms a gear.

The clutch case 2 has a receiving space 201 for receiving the damping part 1 so that the damping part 1 rotates as a whole. The receiving space 201 has an inner diameter y in a direction along a moving direction of the rack part 3 larger than an outer diameter of the second part 110 of the damping part 1, and an inner diameter z in a direction intersecting the moving direction roughly equal to an outer diameter of the second part 110 of the damping part 1.

A coupling projection 203 is formed on a part of an inner wall part 202 forming the receiving space 201. When the damping part 1 moves within the receiving space 201 accompanying the forward movement of the rack part 3, the coupling projection 203 engages the outer perimeter part 111 of the second part 110 of the damping part 1 so that the damping part 1 does not rotate as a whole within the receiving space 201.

In the embodiment, the clutch case 2 has a bottom part 204 facing the receiving space 201, and an open part 205 opening the receiving space 201 on a side opposite to the bottom part 204. The receiving space 201 is formed inside an inner wall part 202 formed along a part of an arc of a virtual circle and a protruding piece 207 capable of elastic deformation and protruding from the bottom part 204 at a discontinuous area 206 of the inner wall part 202 such that an inner face thereof is aligned with the arc of the virtual circle.

Also, in the embodiment, a coupling part 208 is formed on an edge of the open part 205. When the damping part 1 is inserted into the receiving space 201 through the open part 205, the coupling part 208 elastically deforms. Then, the coupling part 208 springs back and engages the edge of the second part 110 of the damping part 1 at a position where the damping part 1 is completely inserted. The coupling parts 208 are provided at three places. Two of the places are formed on the inner wall part 202. The coupling parts 208 formed on the inner wall part 202 are formed on tips of elastic pieces 209 formed by a part of the inner wall part 202 partitioned by two slots extending toward the bottom part 204 of the receiving space 201 with the slot ends free toward outside in the open part 205 of the receiving space 201 so as to stick out toward inside the receiving space 201. The other one of the coupling parts 208 in the three places is formed on a tip of the protruding piece 207 so as to stick out into the receiving space 201.

Also, in the embodiment, coupling surfaces of the coupling parts 208 facing the bottom part 204 of the receiving space 201 engage the edge part on the other side of the second part 110 of the damping part 1 in a state that the damping part 1 rotates as a whole inside the receiving space 201, when the damping part 1 is completely inserted into the receiving space 201 such that one surface of the second part 10 of the damping part 1 faces the bottom part 204 of the receiving space 201. Accordingly, it is possible to assemble the damping part 1 into the clutch case 2 with one touch operation.

The rack part 300 of the rack part 3 engages the pinion part 101 of the first part 100 of the damping part 1 received inside the clutch case 2 throughout the movement of the rack part 3 accompanying the movement of the movable body 500.

The receiving space 201 of the clutch case 2 has the inner diameter y in the direction of the movement of the rack part 3 greater than the outer diameter of the second part 110 of the damping part 1. Accordingly, when the rack part 3 moves by the movement of the movable body 500, the damping part 1 also moves inside the clutch case 2 accompanying the movement. That is, when the rack part 3 moves forward, the damping part 1 also moves in the direction of forward movement of the rack part 3 inside the receiving space 201 of the clutch case 2 (FIG. 5). On the other hand, when the rack part 3 moves backward, the damping part 1 also moves in the direction of backward movement of the rack part 3 inside the receiving space 201 of the clutch case 2 (FIG. 6).

The coupling projection 203 is formed on a part of the inner wall part 202 forming the receiving space 201 of the clutch case 2 for engaging the outer perimeter part 111 of the second part 110 of the damping part 1 moving when the rack part 3 moves forward in this manner, i.e. the gear part 115 of the ring body 114. Accordingly, when the movable body 500 is moved so as to move the rack part 3 forward, the rotation of the damping part 1 as a whole inside the clutch case 2 is stopped. Only the first part 100 applied with damping to the rotation by the viscous fluid is rotated with the second part 110 as a shaft bearing in a state in which the pinion part 101 engages the rack part 300 of the rack part 3. As a result, it is possible to apply damping by means of the rack part 3 to the rotation of the movable body 500 in the direction of moving the rack part 3 forward (FIG. 5).

Conversely, when the movable body 500 moves so as to move the rack part 3 backward, the damping part 1 moves in the direction of backward movement of the rack part 3 inside the receiving space 201 of the clutch case 2. Accordingly, the engagement between the coupling projections 203 formed on the part of the inner wall part 202 forming the receiving space 201 of the clutch case 2 and the outer perimeter part 111 of the second part 110 of the damping part 1 is released. As a result, the damping part 1 rotates as a whole inside the receiving space 201 inside the clutch case 2 by the movement of the rack part 3 in a state that the pinion part 101 of the first part 100 engages the rack part 300 of the rack part 3. Therefore, the damping is not applied to the movement of the movable body 500 in the direction of moving the rack part 3 backward.

In the embodiment, as described later, the rack part 3 has a band-shaped body 301 formed in an arc shape, and moves accompanying movement of the movable body 500 in the direction along the arc. The rack part 3 moves forward upwardly in FIG. 2 accompanying opening up of the glove box 501, i.e. the movable body 500, from the state of being in the housed position. By this forward movement, the coupling projections 203 formed inside the receiving space 201 engage the outer perimeter part 111 of the second part 110 of the damping part 1 moving inside the receiving space 201 upwardly in FIG. 2 (FIG. 5).

That is, in the embodiment, the clutch case 2 is constituted such that the inner diameter of the receiving space 201 is greater than the outer diameter of the second part 110 of the damping part 1 in the vertical direction in FIG. 5. The inner diameter of the receiving space 201 is about equal to the outer diameter of the second part 110 of the damping part 1 in the horizontal direction in FIG. 5. The coupling projections 203 are formed on a part of the inner wall part 202 forming the receiving space 201 positioned at an upper portion in FIG. 5.

In the embodiment, the coupling projections 203 are formed of three projections 203a having a saw-blade shape. A distance between a tip of the coupling projection 203 and the inner wall surface 202 facing opposite to the coupling projection 203 is roughly equal to the outer diameter of the second part 110 of the damping part 1. The damping part 1 rotates the first part 100 forward by forward movement of the rack part 3 (FIG. 5). In the teeth of the gear part 115 of the second part 110, the side part on the forward side of the forward rotation is an engaging side part along a straight line passing through the center of rotation of the second part 110, and the opposite side part is a sloping side part (FIG. 5).

In the coupling projections 203, the side part facing the direction of backward rotation of the damping part 1 is an engaging side part along a straight line passing through the center of rotation of the receiving space 201, and the opposite side part is a sloping side part. When the rack part 3 moves forward such that the first part 100 of the damping part 1 rotates forward, the engaging side parts of the teeth of the gear part 115 of the second part 110 of the damping part 1 engage the engaging side parts of the coupling projections 203 securely, and the rotation of the damping part 1 as a whole is stopped (FIG. 5). On the other hand, when the rack part 3 moves backward such that the damping part 1 rotates backward, the sloping side parts of the teeth of the gear part 115 of the second part 110 of the damping part 1 collide with the sloping side parts of the coupling projections 203. Accordingly, the damping part 1 rotates as a whole inside the receiving space 201, and there is no obstruction to the rotation as a whole (FIG. 6).

In-the embodiment, the clutch case 2 has a fixing shaft 210 inserted into a fixing hole 402 of the clutch case 2 formed in the movable body 500 or the fixed body 400. The clutch case 2 may have a fixing hole for inserting a fixing shaft of the clutch case 2 formed on the movable body 500 or the fixed body 400. In the case, it is possible to fix the clutch case 2 easily and properly to the movable body 500 or the fixed body 400.

In the embodiment, the clutch case 2 has a main body part 212 having the receiving space 201 therein and a bulging part 213 protruding outwardly from the outer surface part of the main body part 212. The bulging part 213 has an installation surface 214 positioned on the same surface as a surface opposite to the open part 205 of the receiving part 201 of the main body part 212. A fixing shaft 210 is provided on the installation surface 214 of the main body part 212 such that one end thereof is joined integrally. A positioning shaft 216 is provided on the installation surface 214 of the bulging part 213 such that one end thereof is joined integrally. The fixing shaft 210 is inserted into a fixing hole 402 formed in the panel 401 disposed inside the instrument panel as the fixed body 400, and the fixing shaft 216 is inserted into a positioning hole 403 formed in the panel 401, so that the clutch case 2 is installed on a surface facing the outer surface of the side plate 502 of the glove box 501 in the instrument panel.

In the embodiment, the fixing shaft 210 has projections 211 capable of elastic deformation and protruding from both sides thereof in the diametric direction. The projections 211 are inserted into the fixing hole 402 while being deformed elastically, and engage the hole edge part on the side forward of insertion of the fixing hole 402 by spring-back of the projections 211 at the position where they are completely inserted in the fixing hole 402, whereby they are fitted into the fixing hole 402.

Also, in the embodiment, the rack part 300 of the rack part 3 is formed on one side part along the longitudinal direction of the band-shaped body 301 as described later. A holding piece 217 for holding the band-shaped body 301 is formed on the clutch case 2 at a position on one side of the band-shaped body 301. Specifically, the rack part 3 is formed of a band-shaped body 301 curved into an arc. The rack part 300 is formed on the edge part positioned on the outside of the curve of the band-shaped body 301. One surface of the rack part 3 contacts the front surface opposite to the installation surface 214 of the clutch case 2, and the pinion part 101 of the first part 100 of the damping part 1 disposed in the receiving space 201 of the clutch case 2 engages the rack part 300 of the clutch case 3. A support part 218 for supporting the holding piece 217 positioned on the other surface of the rack part 3 is formed respectively on each side of the outer surface part of the main body part 212 of the clutch case 2. The rack part 3 is sandwiched to be rotatable between the holding piece 217 supported on the support part 218 and the front surface of the rack part 3.

Accordingly, the rack part 300 of the rack part 3 always properly engages the pinion part 101 of the first part 100 of the damping part 1 with the holding piece 217.

In the embodiment, the rack part 3 is attached to the fixed body 400 so as to be rotatable. Accordingly, the rack part 300 of the rack part 3 always properly engages the pinion part 101 of the first part 100 of the damping part 1. That is, the rack part 300 of the rack part 3 is not shifted sideways in a direction away from the pinion part 101 of the first part 100 of the damping part 1, and is not shifted in the direction of the axis of rotation of the pinion part 101.

In a case that the rack part 3 is not attached to the fixed body 400 to be rotatable, a groove is formed in the rack part 3 along the direction of movement thereof, and a projection is formed on said holding piece 217 for inserting into the groove, so that the same effect of preventing shifting can be obtained.

The rack part 3 is positioned such that the rack part 300 thereof always engages the pinion part 101 of the first part 100 of the damping part 1 disposed inside the clutch case 2 throughout the movement thereof. The clutch case 2 is attached to the fixed body 400 having the movable body 500 capable of rotating about a rotating shaft. The rack part 3 is also attached to the fixed body 400 to be rotatable with a rotating shaft 302 provided at a position different from the rotating shaft 503 of the movable body 500. The rack part 300 is arranged along an arc of a virtual circle around the rotating shaft 302 of the rack part 3. A groove part 303 is provided and extends from the rotating shaft 302 of the rack part 3 to the rack part 300 for receiving a linking projection 504 provided on the movable body 500. A part of the groove part 303 is always positioned on a track of movement α of the linking projection 504 rotating accompanying rotation of the movable body 500.

Concretely, the clutch case 2 is installed on the instrument panel by means of the fixing shaft 210 and positioning shaft 216.

On the other hand, the rack part 3 has the rack part 300 along the side part on the outside of the curve of the band-shaped body 301 curved into an arc. The rack part 300 is arranged along an arc of a virtual circle around the rotating shaft 302 of the rack part 3. The rack part 3 is formed by joining the place of formation of the rotating shaft and the band-shaped member 301 by two arms 304 and 304. Between the two arms 304 and 304, an interval is formed in the direction of rotation of the rack part 3. The groove part 303 extends directly from the rotating shaft to the rack part 300, and is formed on one of the two arms 304 and 304. The rack part 3 has a shaft body 305 inserted into the shaft hole 404 formed in the panel 401 disposed inside the instrument panel to be capable of rotation, and the shaft body 305 functions as the rotating shaft 302.

In the embodiment, the damper device D is installed on the instrument panel such that the linking projection 504 provided on the side plate 502 of the glove box 501 is always received in the groove part 303 of the rack part 3.

In the embodiment, the rotating shaft 302 of the rack part 3 is positioned further upward from the rotating shaft 503 of the glove box 501. The damper device D is installed on the instrument panel such that the rotating shaft 302 of the rack part is positioned on the forward side of opening-up of the glove box 501. The rack part 300 faces an opposite side, and the arm 304 having the groove 303 is positioned above the other arm 304. The glove box 501 moves about the rotating shaft 503 to be opened up from the position before moving (position in FIG. 2) in which the opening of the instrument panel is closed to the position having finished moving (position in FIG. 4). The glove box 501 moves to be closed from the position having finished moving to the position before moving.

The linking projection 504 provided on the outer surface of the side plate 502 of the glove box 501, that is, the side plate 502 having the plate surface along the direction of rotation of the glove box 501, in the position before moving, is positioned on the side of the rack part 300 in the groove part 303 of the rack part 3 of the damper device D installed on the panel 401 disposed inside the instrument panel (FIG. 2). In this state, the pinion part 101 of the first part 100 of the damping part 1 received inside the clutch case 2 engages the rack part 300 on the upper end side of the rack part 300 (FIG. 2). A part of the groove part 303 of the rack part 3 is positioned on the track of movement α of the linking projection 504 provided on the side of the movable body 500 regardless of a position of rotation of the rack part 3 about the rotating shaft 302. The groove part 303 extends along a straight line, not along the track of movement α of the linking projection 504 about the rotating shaft 503 of the movable body 500 as described above.

Accordingly, when the movable body 500 moves forward or the glove box 501 moves to be opened up, the linking projection 504 moves in the forward direction, and the rack part 3 receiving the linking projection 504 in the groove part 303 moves forward about the rotating shaft or upwardly with the linking projection 504 pushed against the groove wall of the groove part 303. The pinion part 101 of the first part 100 of the damping part 1 engages the rack part 3 moving forward in this manner. During the forward movement, the outer perimeter part 111 of the second part 110 of the damping part 1 engages the coupling projection 203 of the clutch case 2, so that the rotation of the damping part 1 as a whole inside the clutch case 2 is stopped.

Therefore, only the first part 100 is rotated while receiving damping by the viscous fluid, whereby damping is applied to the forward movement of the rack part 3, that is, the forward movement of the movable body 500. When the movable body 500 moves forward, the linking projection 504 approaches the rotating shaft 302 of the rack part 3 inside the groove part 303 of the rack part 3 while moving the rack part 3 forward. The distance between the rotating shaft 302 of the rack part 3 (fulcrum) and the position of engagement of the pinion part 101 of the first part 100 with the rack part 300 of the rack part 3 (force point) is always constant. Accordingly, when the linking projection 504 approaches the rotating shaft 302 of the rack part 3 (that is, as the force point becomes closer to the action point), the damping force of the damping part 1 on the linking projection 504 increases. Accordingly, it is possible to increase the damping force on the movable body 500 when the movable body 500, i.e. the glove box 501, moves in the forward direction. The movement is controlled such that the movable body 500 moves comparatively rapidly at the start of forward movement and is gradually slowed toward the end of forward movement When the movable body 500 moves backward after moving forward completely or the glove box 501 moves to be closed, the linking projection 504 moves in the backward direction, and the rack part 3 receiving the linking projection 504 in the groove part 303 moves backward about the rotating shaft 302 or rotates downwardly. During the backward movement, because the outer perimeter part 111 of the second part 110 of the damping part 1 does not engage the coupling projection 203 of the clutch case 2, the damping part 1 rotates as a whole inside the clutch case 2. Accordingly, damping is not applied to the backward movement of the rack part 3, that is, the forward movement of the movable body 500.

Figure 20:
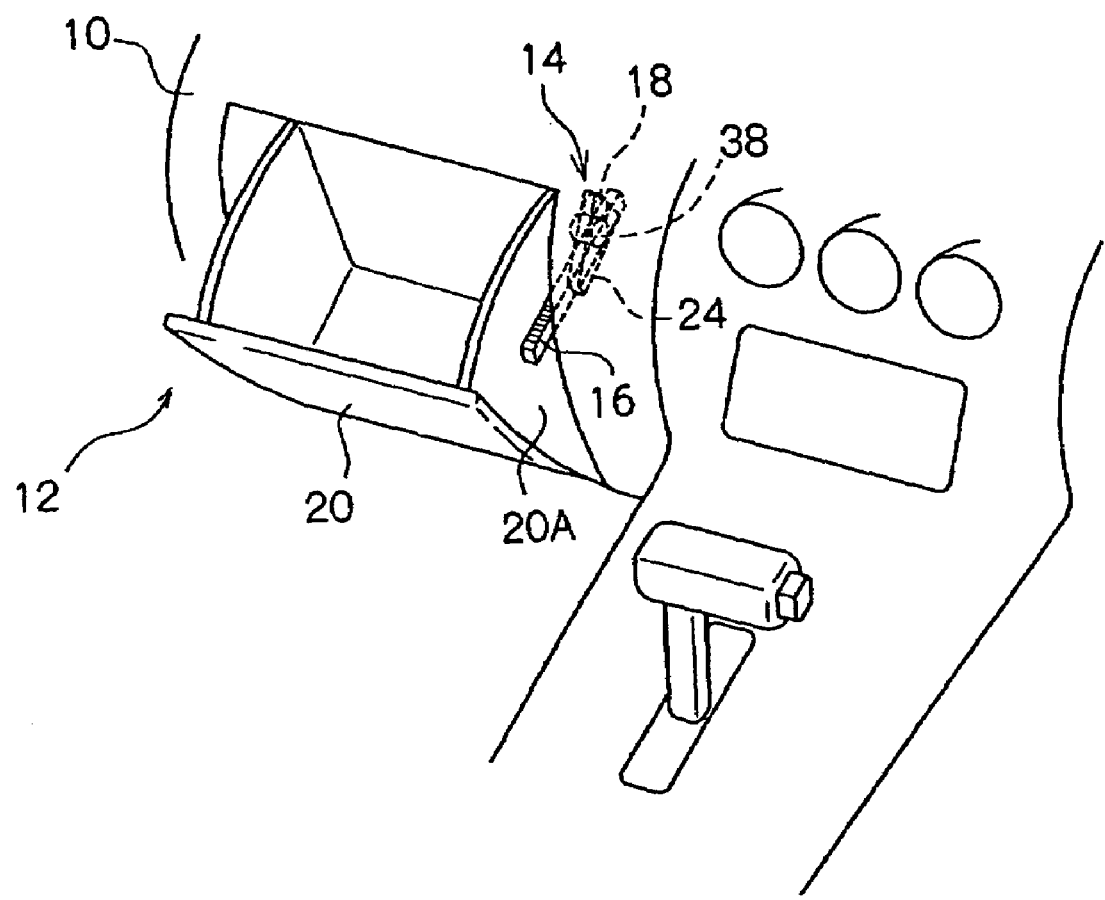
FIG. 20 is a perspective view of an opening-and-closing member of a glove box having a damper mechanism according to an embodiment of the present invention.
Figure 21A:
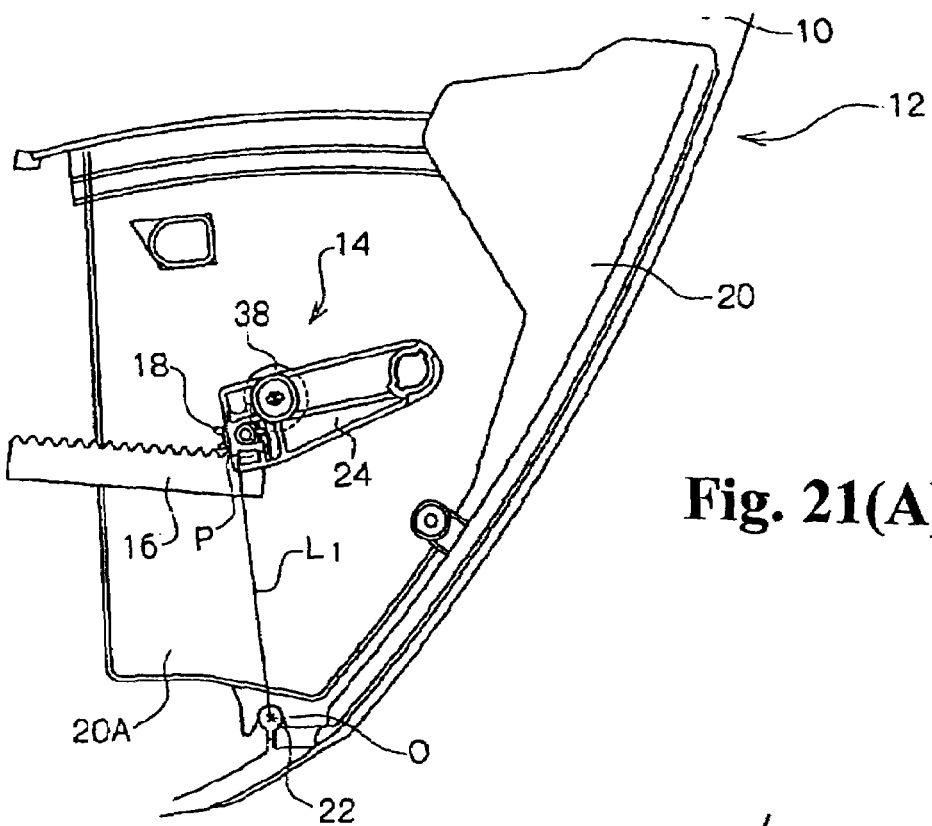
FIGS. 21(A) and 21(B) are side views showing the damper mechanism according to the embodiment of the present invention.

A damper mechanism according to another embodiment of the present invention will be explained next. As shown in FIG. 20, a glove box 12 (so-called compartment) is provided on the front passenger side of an instrument panel 10 (attachment receiving member) of an automobile. An opening-and-closing member 20 of the glove box 12 is formed roughly as a box, and has a damper mechanism 14 as shown in FIG. 21(A) and (B). The damper mechanism 14 comprises a rack 16 and a gear 18 capable of engaging with each other.

The rack 16 has a linear form and is installed on a side wall 20A of the opening-and-closing member 20 to move together with the opening-and-closing member 20. The opening-and-closing member 20 is capable of rotation about on a shaft part 22, and the rack 16 also rotates about the shaft part 22.

Figure 21B:
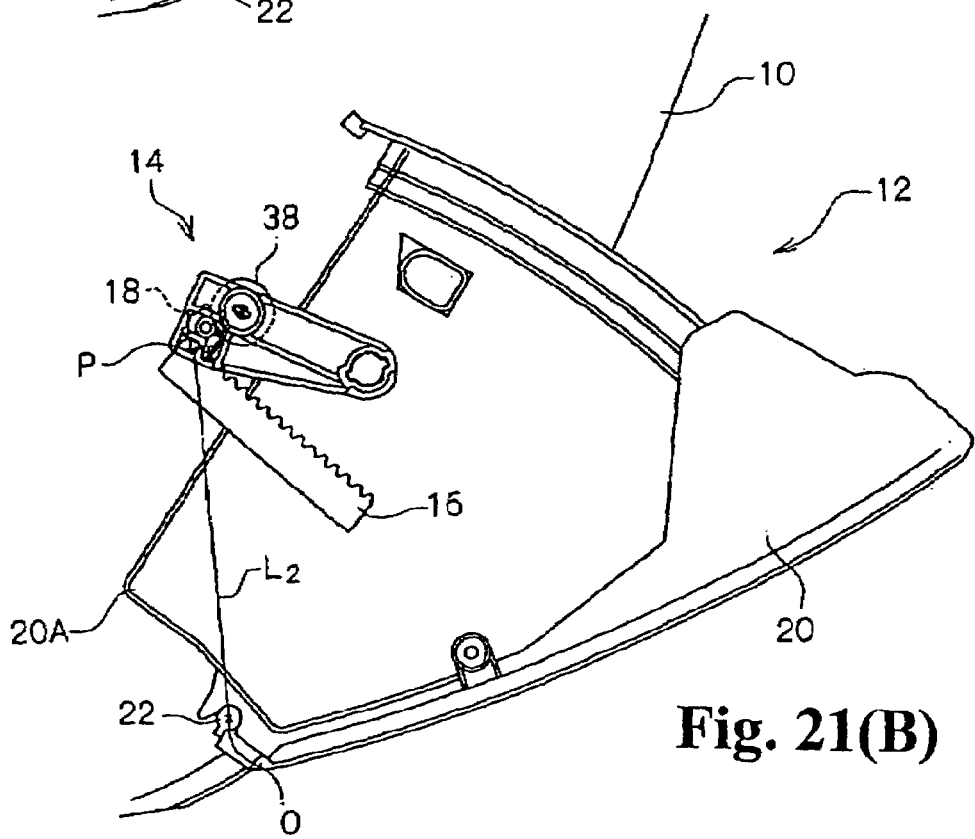
Figure 22:
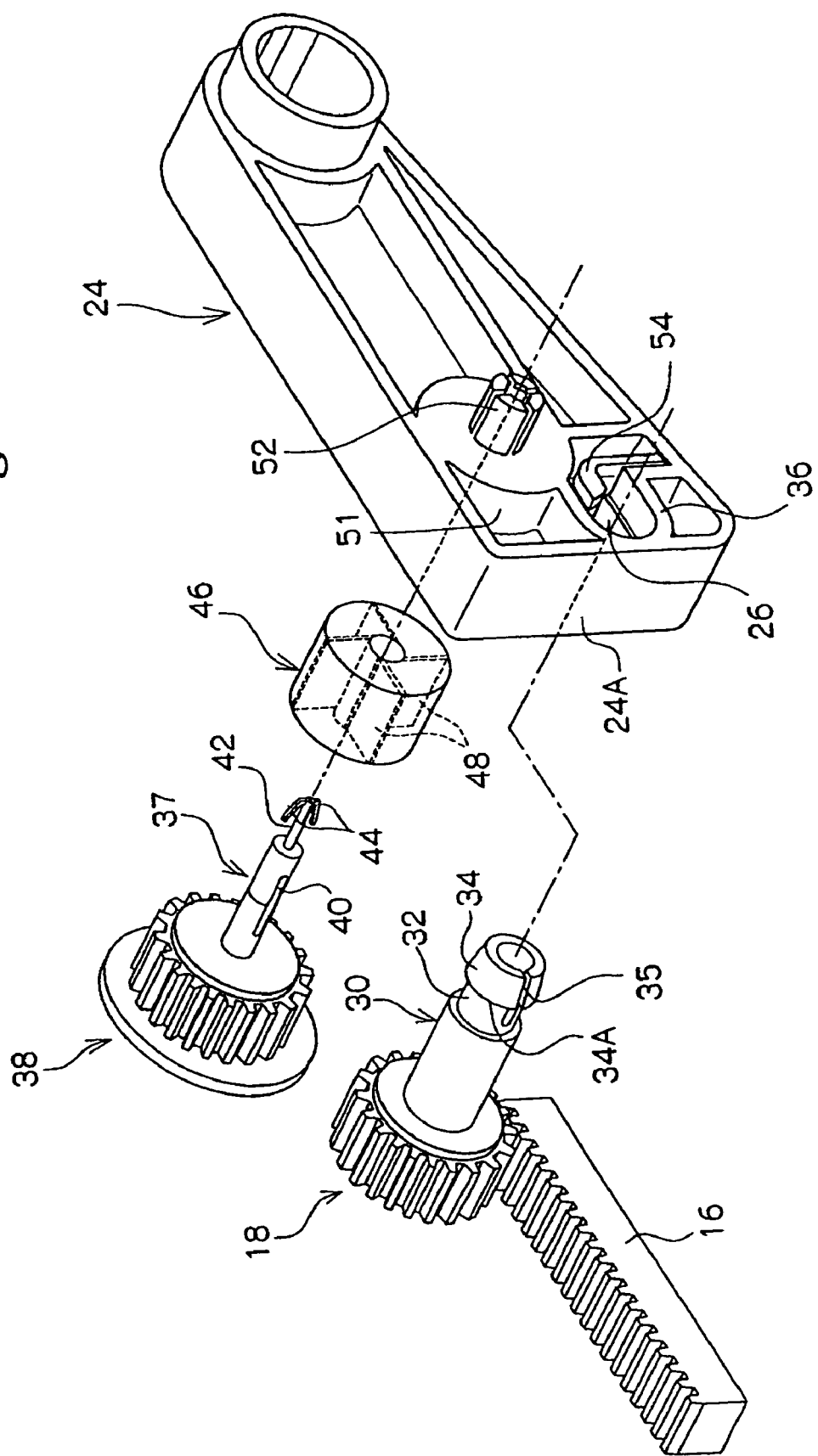
FIG. 22 is an exploded perspective view showing the damper mechanism according to the embodiment of the present invention.
Figure 23A:
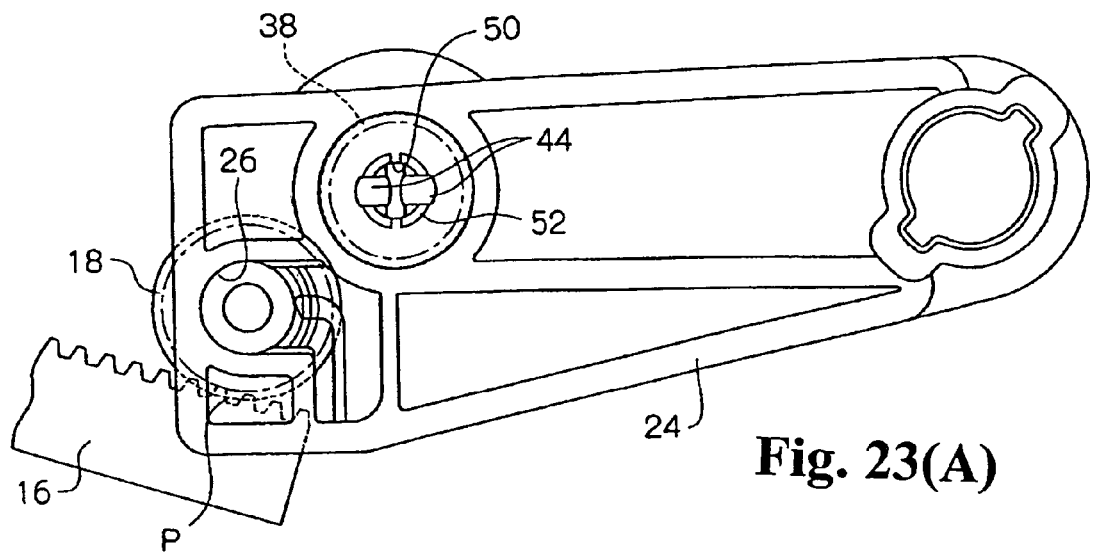

As shown in FIGS. 22, 23(A) and (B) (FIGS. 23(A) and 22(B) are partially enlarged views of FIGS. 21(A) and 21(B)), the gear 18 is installed on one end of a roughly box-shaped base member 24. A long hole 26 is provided in one end of the base member 24, and the shaft part 30 of the gear 18 is inserted into the long hole 26 such that the shaft part 30 of the gear 18 slides along the long hole 26. A small diameter part 32 is formed on the front end side of the shaft part 30 of the gear 18, and a conical part 34 is formed on the front end part. A cut-out part 35 extending along the axial direction of the shaft part 30 is formed on perimeter walls of the small diameter part 32 and the conical part 34, so that the front end side of the shaft part 30 can be contracted.

When the shaft part 30 is inserted into the long hole 26, the small diameter part 32 and the conical part 34 are contracted. When a contact surface 34A formed of the small diameter part 32 and the conical part 34 passes through the front end part of a checking wall 36 placed upright from the inner edge part of the long hole 26 and connected to a perimeter wall 24A of the base member 24, the conical part 34 is restored. Then, the contact surface 34A contacts the front end surface of the checking wall 36, and the gear 18 engages the base member 24 to be slidable.

As shown in FIG. 21(A), the other end part of the base member 24 is supported on the instrument panel 10 to be rotatable so that the gear 18 can engage one end part of the rack 16 in a state that the opening-and-closing member 20 is closed. A torsion spring (not shown) is disposed on the other end side of the base member 24 for urging the one end side of the base member 24, i.e. a free end, toward the rack 16.

When the opening-and-closing member 20 opens, the base member 24 rotates via the rack 16 and the gear 18, and a position of the rack 16 engaging the gear 18 is shifted. As shown in FIG. 21(B), in the position at the end of opening (open position) of the opening-and-closing member 20, the gear 18 is disposed so as to engage the other end part of the rack 16.

Figure 23B:
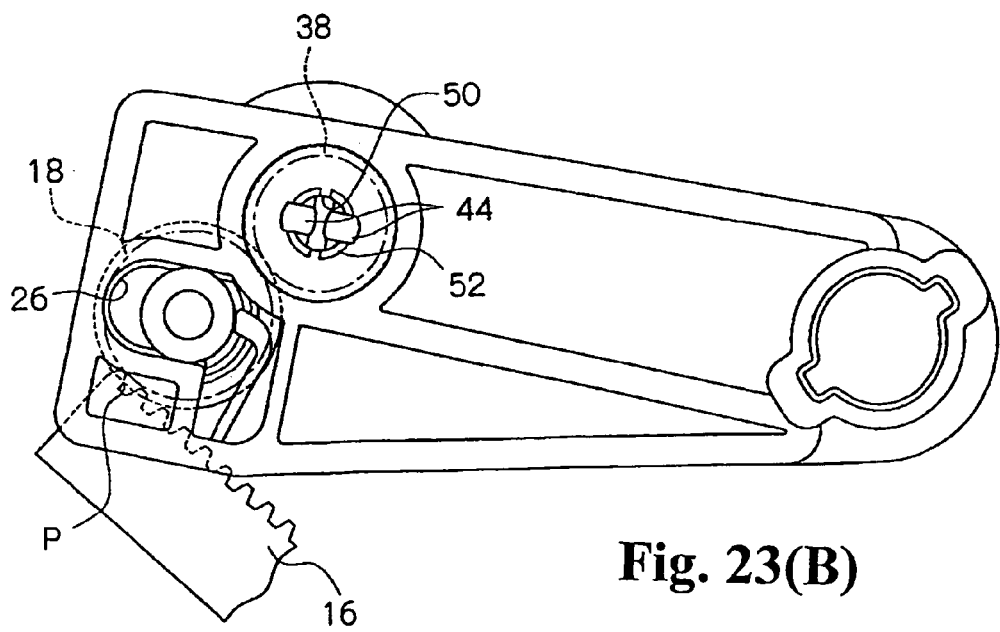
Figure 24A:
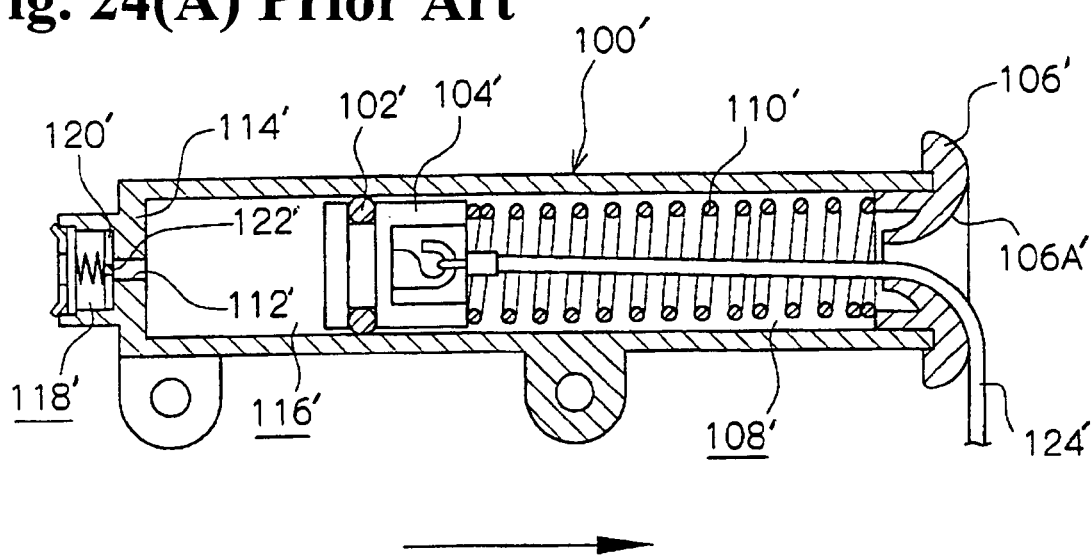
Figure 24B:
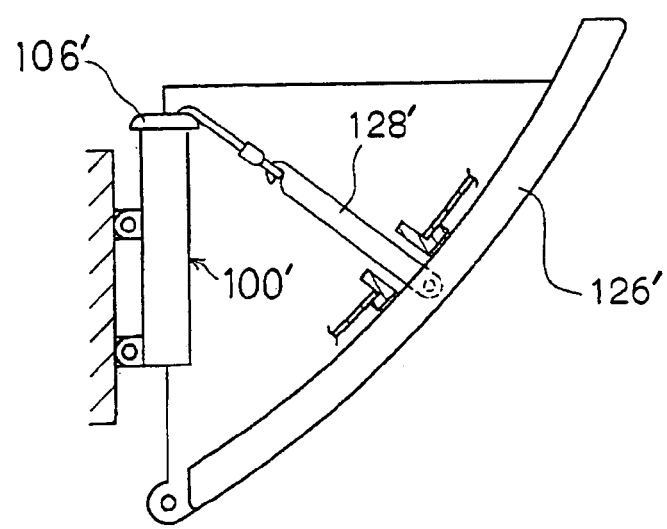

As shown in FIGS. 22, 23(A) and 23(B), a gear 38 capable of engaging the gear 18 is disposed on the base member 24. When the gear 18 slides along the long hole 26, the gear 18 is located in a position capable of engaging or disengaging relative to the gear 38. In the position where the gear 18 engages the gear 38, when the opening-and-closing member 20 (see FIGS. 21(A) and 21(B)) is opened, the gear 38 is disposed in a direction that the rack 16 presses the gear 18, so that the gear 18 securely engages the gear 38.

A coupling part 40 is provided on the outer perimeter of the shaft part 37 of the gear 38 along the axial direction of the shaft part 37 to be capable of elastic deformation. A small diameter part 42 is formed on the front end side of the shaft part 37. A pair of checking hooks 44 is formed on the front end side of the shaft part 37, and extends moving away from each other toward tips. The checking hooks 44 are capable of elastic deformation. A cylindrical damper 46 filled with oil is connected to the shaft part 37. When the shaft part 37 of the gear 38 passes through an axial core part of the damper 46, the checking hooks 44 are contracted in diameter and pass through the axial core part. The coupling part 40 engages a coupling receiving part (not shown) provided at the axial core part of the damper 46, so that the damper 46 is connected to the shaft part 30. Accordingly, when the gear 38 rotates, viscosity resistance and the like is applied to a wing 48 disposed inside the damper 46 via the shaft part 37, thereby applying damper force (damping force by the damper 46) to the gear 38.

A receiving cavity 51 is formed in the base member 24 from a bottom surface of the base member 24 toward inside for receiving the damper 46. A backside of a bottom surface of the receiving cavity 51 is flash with a front end surface of the checking wall 36 and a front end surface of the perimeter wall 24A of the base member 24. A round hole 50 is formed at the center part of the receiving cavity 51 for passing the shaft part 37, and a checking wall 52 is placed upright from the perimeter part of the round hole 50 on the opposite side of the receiving cavity 51.

The damper 46 is received inside the receiving cavity 51, and the axial core part of the damper 46 is inserted into the round hole 50 in a state the checking hooks 44 are contracted. When the checking wall 52 passes the tips of the checking hooks 44, the checking hooks 44 are restored. Then, the tips of the checking hooks 44 contact the front end surface of the checking wall 36, and the gear 38 engages the base member 24 in a state of being exposed from the receiving cavity 51. One end part of a torsion spring 54 is fixed to the base member 24, and the other end of the torsion spring 54 contacts the gear 18 to urge the gear 18 in the direction away from the gear 38. Accordingly, when the opening-and-closing member 20 is opened, the gear 18 is pressed by the rack 16 in the direction against the force of the torsion spring 54, and engages the gear 38.

An operation of opening the opening-and-closing member 20 of the glove box using the damper mechanism according to the embodiment of the present invention will be explained next.

As shown in FIGS. 21(A) and 23(A), in the state that the opening-and-closing member 20 is closed, the gear 18 engages one end part of the rack 16. The gear 18 is also urged by the torsion spring 54 in the direction away from the gear 38, and is disengaged from the gear 38. When the opening-and-closing member 20 is opened from this state, as shown in FIG. 21(B) and FIG. 23(B), the rack 16 rotates about the shaft part 22 together with the opening-and-closing member 20. The gear 18 is pressed by the rack 16 in the direction against the force of the torsion spring 54, and slides inside the long hole 26 of the base member 24. Accordingly, the gear 18 engages the gear 38, so that the damper effect from the damper 46 is transmitted to the gear 18 via the gear 38. The damper effect is transmitted to the opening-and-closing member 20 via the rack 16, and the opening-and-closing member 20 is opened slowly.

At this time, as the opening-and-closing member 20 is opened, the engagement position between the rack 16 and the gear 18 shifts from one end part of the rack 16 to the other end part of the rack 16. One end of the base member 24 rotates toward the direction away from the rotation central position O of the opening-and-closing member 20.

An operation of closing the opening-and-closing member 20 of the glove box using the damper mechanism according to the embodiment of the present invention will be explained next.

When the opening-and-closing member 20 is closed, the rack 16 moves toward the direction away from the gear 18, so that the force no longer works in the direction of pressing the gear 18 toward the gear 38. Accordingly, the gear 18 slides toward the direction away from the gear 38 by the force of the torsion spring 54 (see FIG. 23(A)). Accordingly, the damper effect from the damper 46 is not transmitted to the gear 18. That is, the load of the damper 46 is not applied when the opening-and-closing member 20 is closed.

An operation of the damper mechanism according to the embodiment of the present invention will be explained next. As shown in FIG. 21(B) and FIG. 23(B), the rack 16 is attached to the opening-and-closing member 20 to be rotatable together with the opening-and-closing member 20. The gear 18 engages the rack 16, and the gear 38 connected to the damper 46 can engage the gear 18. The damper effect is applied to the opening-and-closing member 20 via the gear 38, the gear 18, and the rack 16, in the state that the gear 18 engages the gear 38.

The base member 24 is installed in the instrument panel 10 to be rotatable, and the gears 18 and 38 are disposed on the base member 24. The gear 18 is capable of sliding, and is capable of engaging or disengaging from the gear 38. Accordingly, when the opening-and-closing member 20 is opened, the gear 18 is pressed by the rack 16 moving together with the opening-and-closing member 20, and the gear 18 engages the gear 38, thereby applying the damper effect to the opening-and-closing member 20 so that the opening-and-closing member 20 is opened slowly.

As shown in FIG. 21(A) and FIG. 23(A), when the opening-and-closing member 20 is closed, the gear 18 slides in the direction of disengaging from the gear 38, so that the damper effect is not transmitted to the gear 18. Accordingly, when the opening-and-closing member 20 is closed, the load of the damper 46 is not applied to the opening-and-closing member 20.

As described above, the long hole 26 is formed in the base member 24. The gear 18 slides for transmitting the damper effect to the opening-and-closing member 20, to engage or disengage from the gear 38. Accordingly, it is possible to turn on and off the torque transmission from the damper 46, thereby making the damper mechanism 14 one way.

In the embodiment, the gear 18 is pressed by the rack 16 moving together with the opening-and-closing member 20, and the gear 18 engages the gear 38 to obtain the damper effect. It is possible to reduce an idle time until the damper takes effect by decreasing the distance between the gear 18 and the gear 38. Accordingly, when the opening-and-closing member 20 is closed, even immediately after the opening-and-closing member 20 is opened, the gear 18 engages the gear 38 immediately to obtain the damper effect.

As shown in FIGS. 21(A) and 21(B), the rack 16 is formed in a linear shape and the base member 24 is installed on the side wall of the instrument panel 10 to be rotatable. Accordingly, it is possible to adjust a distance between an engaged position P where the gear 18 engages the rack 16 and a rotation central position O of the opening-and-closing member 20. Accordingly, it is possible to adjust a force necessary for opening the opening-and-closing member 20 at the engaged position P of the gear 18 and the rack 16. That is, in the case that the damper force (damping force by the damper member) is constant, if the force necessary for opening the opening-and-closing 20 member is large, the damper effect is reduced as compared with a case that the force is small.

Therefore, the distance between the engaged position P of the gear 18 and the rack 16, and the rotation central position O of the opening-and-closing member 20 is changed. At the start of opening (closed position) of the opening-and-closing member 20, a distance $L_1$ between the engaged position P of the rack 16 and the gear 18, and the rotation central position O of the opening-and-closing member 20 is made shorter. Accordingly, the force necessary for opening the opening-and-closing member 20 is made greater at the engaged position P of the gear 18 and the rack 16. At the end of opening (open position) of the opening-and-closing member 20, a distance $L_2$ between the engaged position P of the rack 16 and the gear 18 and the rotation central position O of the opening-and-closing member 20 is made larger, so that the force is made smaller. Accordingly, at the closed position of the opening-and-closing member 20, the damper effect becomes smaller than the open position. Therefore, it is possible to securely open the opening-and-closing member 20 even in a low-temperature region.

In the present embodiment, the rack 16 is formed in a linear shape, and may be formed in an arc shape around the rotation central position O of the opening-and-closing member 20. In this case, the effect as a one-way damper is obtained, and the damping effect is about the same between the closed position and the open position of the opening-and-closing member 20. The rack may be formed in an arc shape such that a distance from the rotation central position O of the opening-and-closing member 20 becomes longer as the opening-and-closing member 20 is opened. Accordingly, it is possible to change the damper effect between the closed position and the open position of the opening-and-closing member 20.

Furthermore, in the present embodiment, the rack 16 is fixed and the base member 24 rotates. The present invention is not limited to this structure, and the rack 16 may rotate, as far as the distance between the engaged position P of the rack 16 and the gear 18 and the rotation central position O of the opening-and-closing member 20 can be changed. The opening-and-closing member 20 is formed in a roughly box shape, and the opening-and-closing member 20 may be formed in a plate shape. In this case, the rack 16 may protrude in a direction perpendicular to the door.

The disclosures as disclosed in Japanese Patent Applications No. 2003-284067 and No. 2003-343092 are incorporated herein.

While the invention has been explained with reference to the specific embodiments of the invention, the explanation is illustrative and the invention is limited only by the appended claims.

What is claimed is:

1. A damper device for applying damping force to a movable body movably attached to a fixed body, comprising:
   a rack part movable together with the movable body and having an engaging part,
   a damping part having a first part and a second part both being rotatable around an axis, and viscous fluid for providing damping force to the axis, one of said first part and the second part being rotatable with the other of the first part and the second part for bearing, said first part having a pinion part for engaging the engaging part of the rack part and said second part having a gear on an outer periphery thereof, and
   a clutch case attached to one of the fixed body and the movable body, and having a receiving space for retaining the damping part to be rotatable therein and a coupling projection for engaging the gear of the second part, said receiving space having a first inner diameter, extending in a first direction along a movement of the rack part, larger than an outer diameter of the second part of the damping part and a second inner diameter, extending in a second direction perpendicular to the first direction, substantially equal to an outer diameter of the second part of the damping part, said coupling projection engaging the gear of the second part so that only the first part rotates to generate the damping force when the rack part moves in one direction along the first direction, said coupling projection being disengaged from the gear of the second part when the rack part moves in a direction opposite to said one direction.

2. A damper device according to claim 1, wherein said clutch case includes a fixing shaft for inserting into a hole formed in the movable body or the fixed body.

3. A damper device according to claim 1, wherein said rack part includes a band-shaped body provided with the engaging part, and said clutch case includes a holding piece for holding the band-shaped body.

4. A damper device according to claim 1, wherein said clutch case includes an open part communicating with the receiving space, and a coupling part disposed at an edge of the open part and formed of an elastic material, said coupling part engaging the second part of the damping part when the damping part is inserted into the receiving space through the open part.

5. A damper device according to claim 1, wherein said clutch case is attached to the fixed body, said movable body is attached to the fixed body to be rotatable around a first rotating shaft, said rack part is attached to the fixed body to be rotatable around a second rotating shaft situated at a position different from that of the first rotating shaft, and said rack part is arranged along an arc of a circle around the second rotating shaft and includes a groove part extending from the second rotating shaft toward the engaging part for receiving a linking projection provided on the movable body so that a part of the groove part is always situated on a movement track of the linking projection.

6. A damper mechanism for applying damping force to a movable body movably attached to a fixed body, comprising:
   a rack attached to one of the movable body and the fixed body,
   a first gear movably attached to the other of the movable body and the fixed body and engaging the rack,
   a second gear arranged to be engageable with the first gear,
   a damper attached to the second gear for generating the damping force, and
   a base member attached to the other of the movable body and the fixed body, said base member rotationally holding the second gear and having a portion for slidably supporting the first gear for moving the first gear to engage the second gear when the movable body moves toward a first direction, and for holding the first gear away from the second gear when the movable body moves toward a second direction.

7. A damper mechanism according to claim 6, wherein said base member includes a long hole as said portion for slidably supporting the first gear and said first gear includes a shaft slidably situated in the long hole.

8. A damper mechanism according to claim 6, further comprising urging means attached to the base member for urging the first gear away from the second gear.

9. A damper mechanism according to claim 6, wherein a distance from an engaging point of the first gear and the rack to a rotational center of the movable body is changed according to a rotation of the movable body.

10. A damper mechanism according to claim 9, wherein said rack has a linear shape, and said base member is pivotally attached to the fixed body.

11. A damper mechanism according to claim 1, wherein said first part has a space filled with said viscous fluid for providing the damping force to the axis.

12. A damper device according to claim 1, wherein said clutch case includes a fixing hole for receiving a shaft formed on the movable body or the fixed body.

* * * * *